(12) United States Patent
Campbell et al.

(10) Patent No.: US 11,273,527 B2
(45) Date of Patent: Mar. 15, 2022

(54) METHOD OF TERMINATING A STRANDED SYNTHETIC FILAMENT CABLE

(71) Applicant: Bright Technologies, LLC, Havana, FL (US)

(72) Inventors: Richard V. Campbell, Havana, FL (US); David W. Hilbig, Havana, FL (US); Kristopher L. Wortham, Havana, FL (US); David E. Sediles, Havana, FL (US)

(73) Assignee: Bright Technologies, LLC, Havana, FL (US)

( * ) Notice: Subject to any disclaimer, the term of this patent is extended or adjusted under 35 U.S.C. 154(b) by 0 days.

(21) Appl. No.: 16/721,308

(22) Filed: Dec. 19, 2019

(65) Prior Publication Data

US 2020/0331104 A1 Oct. 22, 2020

Related U.S. Application Data

(63) Continuation of application No. 13/678,664, filed on Nov. 16, 2012, now Pat. No. 10,543,573, which is a continuation-in-part of application No. 12/889,981, filed on Sep. 24, 2010, now Pat. No. 8,371,015.

(51) Int. Cl.
| | |
|---|---|
| *B23P 11/00* | (2006.01) |
| *D07B 1/02* | (2006.01) |
| *F16G 11/02* | (2006.01) |
| *F16G 11/03* | (2006.01) |
| *F16G 11/14* | (2006.01) |
| *F16G 11/04* | (2006.01) |

(52) U.S. Cl.
CPC .............. *B23P 11/00* (2013.01); *D07B 1/025* (2013.01); *F16G 11/025* (2013.01); *F16G 11/03* (2013.01); *F16G 11/042* (2013.01); *F16G 11/146* (2013.01); *Y10T 29/4989* (2015.01)

(58) Field of Classification Search
CPC ...... B23P 11/00; F16G 11/042; F16G 11/025; F16G 11/03; F16G 11/146; D07B 1/025; Y10T 29/4989
See application file for complete search history.

(56) References Cited

U.S. PATENT DOCUMENTS

| | | | | |
|---|---|---|---|---|
| 2,341,922 | A * | 2/1944 | Robbins | F16G 11/05 403/23 |
| 4,473,915 | A * | 10/1984 | Finsterwalder | E01D 19/14 14/18 |
| 2010/0104377 | A1 * | 4/2010 | Campbell | F16G 11/05 405/259.5 |

* cited by examiner

*Primary Examiner* — Jason L Vaughan
(74) *Attorney, Agent, or Firm* — J. Wiley Horton

(57) ABSTRACT

An apparatus and method for terminating a multi-stranded, non-parallel cable. An anchor is provided on the end of each strand. A collector is provided to link the anchors and connected strands into a single unit. An alignment fixture is provided to transition the strands from the non-parallel lay within the cable to a parallel path adjacent to the anchors.

10 Claims, 43 Drawing Sheets

METHOD OF TERMINATING A STRANDED SYNTHETIC FILAMENT CABLE

FIELD OF THE INVENTION

This invention relates to the field of synthetic cable terminations. More specifically, the invention comprises a method for terminating a large, multi-stranded cable having at least a partially non-parallel construction.

DESCRIPTION OF THE RELATED ART

Synthetic rope/cable materials have become much more common in recent years. These materials have the potential to replace many traditional wire rope assemblies. Examples of synthetic fibers used in cables include KEVLAR, TWARON, TECHNORA, SPECTRA, DYNEEMA, ZYLON/PBO, VECTRAN/LCP, NYLON, POLYESTER, GLASS, and CARBON (fiber). Such fibers offer a significant increase in tensile strength over traditional materials. However, the unique attributes of the synthetic materials can—in some circumstances—make direct replacement of traditional materials difficult. This is particularly true for larger cables. As those skilled in the art will know, it is not practical to simply scale up termination technology used in small synthetic cables and expect it to work on large synthetic cables.

This disclosure will employ consistent terminology for the components of a synthetic cable. The reader should note, however, that the terminology used within the industry itself is not consistent. This is particularly apparent when referring to cables of differing sizes. A component of a small cable will be referred to by one name whereas the analogous component in a larger cable will be referred to by a different name. In other instances, the same name will be used for one component in a small cable and an entirely different component in a large cable. In order to avoid confusion, the applicants will present a naming convention for the components disclosed in this application and will use that naming convention throughout. Thus, terms within the claims should be interpreted according to the naming convention presented.

First, the terms "rope" and "cable" are synonymous within this disclosure. No particular significance should be attached to the use of one term versus the other. The smallest monolithic component of a synthetic cable will be referred to as a filament. A grouping of such filaments will be referred to as a "strand." The filaments comprising a strand may be twisted, braided, or otherwise gathered together. Strands are grouped together to form a cable in one or more stages. As an example, strands may be grouped together into "strand groups" with the strand groups then being grouped together to form a cable. Additional layers of complexity may be present for larger cables. A particularly large cable might be grouped as follows (from smallest to largest): filament, strand, strand group, strand group group, cable. The term "strand group" is generally only used for massive cables. However, it is not used consistently in the industry. In any event, the term "strand" is always used to indicate some portion of a cable that is less than the entire cable itself. Many different subdivisions of a cable may appropriately be called a strand.

The filaments and strands will normally be tension-carrying elements. However, some cables include other elements, such as one or more strands intended to measure strain. The invention is by no means limited to cables including only tension-carrying elements.

The process of grouping filaments, strands, or strand groups together commonly involves weaving, braiding, twisting, or wrapping. For example, it is common to wrap six twisted strands around a twisted straight "core" strand in a helical pattern. Some examples of cable construction will aid the reader's understanding.

FIG. 1 shows a prior art cable 10 comprised of seven strands 12. A single "core" strand is placed in the center. Six outer strands are then helically wrapped about the core strand to form the pattern shown. FIG. 2 shows an individual strand 12. Strand 12 is comprised of many individual filaments 16 which are also wrapped in a helical pattern. Jacket 14 surrounds and encapsulates the filaments in this particular example. A jacket is included on some strands and not on others. A jacket may assume many forms. Some are an extruded covering. Some are a helical wrapping. Still others are a braided or woven layer of filaments which surround the core filaments.

The scale of the strand and filaments of FIG. 2 is significant to understanding the present invention. Each individual filament is quite small, having a diameter which is typically less than the diameter of a human hair. The filaments shown in FIG. 2 are larger in comparison to the overall cable diameter than is typical for synthetic cables. The larger filament diameter is shown for purposes of visual clarity. Strand 12 in FIG. 2 might have an overall diameter between 1 and 15 mm. Several such strands may be grouped directly together to make a cable as shown in FIG. 1.

FIG. 3 shows a cable having three levels of grouping. Filaments are grouped together to make strands 12. Seven strands are then grouped together to form a strand group 19. Seven such strand groups 19 are then grouped together to form cable 10. As explained previously, the term "strand group" may also be referred to as a "strand" (since it is a subdivision of the entire cable). Note that the entire cable may be encompassed by a jacket 14. As for the smaller levels, the jacket may assume many forms.

The reader will note that the cable as a whole has central axis 30 running down its center. The strands 12 generally run in the direction of central axis 30 but they are not all parallel to it. For the example of FIG. 3, each strand 12 is wrapped in a helical fashion (except the core strand of each strand group). Strand groups 19 are shown as being nearly parallel to central axis 30. However, in other examples the strand groups may be helically wrapped around the central axis as well. In still other examples they may be braided or woven. In the context of this disclosure, the term "non-parallel" simply means that a strand is not parallel to the cable's overall central axis. The strand may, on average, follow the central axis. But, at any given point a normal vector of the strand's cross section is not parallel to the overall central axis of the cable. The strand follows a curved path (formed by processes such as twisting, braiding, etc.)

Most prior art cables made using synthetic filaments are relatively small. The example of FIG. 1 might have an overall diameter between 1 mm and 15 mm. Of course, the individual filaments within the strands are very small. A synthetic filament is analogous to a single steel wire in a bundled wire rope. However, the individual synthetic filament behaves very differently in comparison to a piece of steel wire. When such a comparison is made, the synthetic filament is: (1) significantly smaller in diameter; (2) much less stiff (having very little resistance to buckling and quite vulnerable to bending-induced deformation); and (3) slicker (The synthetic strand has a much lower coefficient of friction). Of these differences, the lower stiffness inherent in the use of synthetic filaments is the most significant.

Another significant difference between the individual filaments comprising a synthetic cable and the steel wires commonly used in wire ropes is the scalability of the most basic component. Steel wire is typically created by a drawing process. This allows the wire to be created in a wide range of sizes. A small diameter steel wire is used to make a small wire rope and a large diameter steel wire is used to make a large wire rope. The most basic component of a wire rope—the steel wire—may be easily scaled to match the size of the wire rope. This is not true for the use of synthetic filaments. A synthetic filament having suitable properties is limited to a fairly narrow range of diameters. Thus, the basic component of a synthetic cable is not scalable. A very fine filament must be used for a small synthetic cable and essentially the same size of filament must be used for a large synthetic cable.

In order to carry a useful tensile load any cable material must have a termination (typically on its end but in rare occasions at some intermediate point). The word "termination" means a load-transferring element attached to the cable that allows the cable to be attached to something else. A portion of the cable itself will typically lie within the termination. For a traditional cable made of steel wire, a termination is often created by passing the cable around a thimble (with an eye in the middle) and clamping or braiding it back to itself. For higher load situations, the end of a wire rope may be terminated using a socket. The word "socket" in the context of wire rope terminations means a generally cylindrical steel structure with a conical cavity. The sheared end of the wire rope is placed in the cavity and the individual wires are then splayed apart. Molten zinc is then poured into the cavity and allowed to solidify (Epoxy resins and other synthetic materials may now be substituted for the zinc) Such a socket commonly includes an eye or other feature allowing the cable to be attached to an external component.

A variation on the socket approach has been successfully employed for synthetic cables having a relatively small diameter. The device actually placed on the end of a synthetic cable in order to create a termination is commonly referred to as an "anchor." FIGS. 4-6 show one process for creating a termination on a synthetic cable using such an anchor.

In FIG. 4, cable 10 has been cut to a desired length. The individual strands are very flexible. Accordingly, binder 20 has been added some distance back from the cut end. This distance is labeled "set-back distance" 36. The set-back distance is roughly equal to the length of filaments which will be placed within the cavity in a termination. Free filaments 26 are unbound and free to flex. The binder wraps around the cable and primarily helps it retain a compressed or otherwise bound cross section to better control filament movements during processing. The use of a binder is preferred.

Splayed filaments 34 are placed within the cavity of an anchor. They are generally splayed apart before they are placed in the anchor cavity, but they may also be splayed apart after they are placed in the anchor cavity. In a traditional potting process, the cavity is then filled with a liquid potting compound. The term "potting compound" means any substance which transitions from a liquid to a solid over time. A common example is a two-part epoxy. The two epoxy components are mixed and poured or injected into the cavity before they have cross-linked and hardened. Other compounds are cured via exposure to ultraviolet light, moisture, or other conditions.

FIG. 5 shows a section view through such a termination after the potting compound has hardened into a solid. Anchor 24 includes a tapered cavity through its center. A length of filaments is locked into potted region 28 by the hardened potting compound. Free filaments 26 rest outside the anchor.

In the example of FIG. 5, a single strand has attached to a single anchor. This is not the only possibility and the invention is not limited to just this one possibility. It is possible to attach multiple strands to a single anchor (such as by potting a three-strand twisted rope into a single anchor). This would be a connection between a single anchor and a strand group. It is also possible to divide a single strand into a plurality of substrands and attach each of the sub-strands to an anchor. Thus, one strand could be attached to two or more anchors.

An anchor attached to a cable typically includes a load-transmitting feature designed to transmit a tensile load on the cable to some external component. This could be a hook or an external thread. As such features are well understood in the art, they have not been illustrated.

Those skilled in the art will know that an anchor may be attached to a cable by many means other than potting. Another well-known example is a frictional engagement where the splayed strands are compressed between two adjacent surfaces. A "spike and cone" connection, sometimes referred to as a "barrel and socket" connection, attaches an anchor to a cable using this approach. An example of such a connection is shown in FIG. 39 (and described in more detail subsequently).

Another approach to creating a termination is to cast a composite "plug" on the end filaments of a cable. The plug is preferably cast in a desirable shape that allows it to be easily attached to an external component.

The cable of FIG. 5 is relatively small—having a diameter between 1 mm and 10 mm. The potting process and other mechanical termination means work fairly well for such cables. FIG. 6 shows a perspective view of a completed assembly where the anchor is attached via potting. Anchor 24 and potted region 28 collectively form termination 32 on one end of cable 10. The reader should note that cable 10 is parallel to anchor 24. The filaments within the cable may be non-parallel (They may for example be helically wrapped or braided). However, the overall centerline of the cable is parallel to the centerline of the anchor. This constraint is significant, because the ultimate strength of synthetic cables decreases significantly if the freely flexing portion of the cable is angularly offset with respect to the anchor. The desired alignment becomes a more difficult problem for larger cables—as will be seen.

FIG. 7 shows a larger cable 10. The example shown has a diameter of 50 mm (Even larger synthetic cables are presently in use). Braided jacket 18 surrounds and encloses smaller strand components and strand group ultimately individual filaments. Binder 20 is placed around the cable and the jacket is removed for loose portion 22. For a cable of this size, loose portion 22 is comprised of tens of thousands to millions of individual filaments. The filaments are very flexible, having a stiffness that is similar to human hair. The loose portion is akin to the head of a mop—though it is in reality even less organized and much more flexible than the head of a mop.

It is very difficult to employ the prior art termination process for the synthetic filament cable shown in FIG. 7. FIG. 8 shows an anchor 24 which is sized for this cable. The anchor has a diameter of approximately 150 mm. Unlike larger steel wires used in the prior art, the loose filaments are not stiff enough to remain organized when they are placed in the cavity within anchor 24. It is very difficult to maintain any type of organization while the liquid potting compound is added to the cavity (or when any other type of termination technology is used, with the "spike and cone" frictional type of anchor being another example). The filaments tend to lose the aligned orientation needed to produce a consistent termination. In this potted termination example, the filaments when oriented upward tend to become a disorganized tangle, and are generally inconsistent in alignment. The alignment issue worsens with increasing scale as the filament volume and termination length both increase.

The result is a termination which commonly fails well below the ultimate tensile strength of the cable—obviously an undesirable result. In addition, the disorganized nature of the strands within the cavity produces a substantial variation in strength from one termination to the next. In other words, the process of terminating a large synthetic cable is not predictable nor is it repeatable.

One prior art approach to this problem has been to subdivide the cavity within anchor 24 using some type of insert. The insert subdivides the tapered cavity into several wedge-shaped sections. The available filaments are then divided evenly among the wedge-shaped sections. This approach helps improve certain performance characteristics but does not address the majority of significant processing challenges inherent with large synthetic cables.

The present invention solves the problem of larger cables by (1) dividing the cable into smaller components which are in the size range suitable for the prior art termination technology; (2) providing a collector which reassembles the individual terminations back into a single unit; and (3) maintaining reasonable alignment between the terminations and the smaller cable components while the terminations are "captured" within the collector.

The goal of maintaining alignment between the terminations and the smaller cable components is significant. Some additional explanation regarding the need for good alignment between the strands and the anchors used to terminate them may aid the reader's understanding. FIGS. 9 and 10 illustrate the result of flexing a strand 12 before or during the termination process.

In FIG. 9, strand 12 has been flexed. Jacket 14 has slipped somewhat with respect to filaments 16 it contains. Filaments have also slipped with respect to each other. In FIG. 10, the same strand has been straightened. The reader will observe that some of the filament slippage remains. This is the result of the fact that synthetic filaments have very low stiffness. When they slip relative to one another, there is no significant restoring force. A bend or kink may exist in an individual filament, but little restoring force is produced. For a prior art wire cable, the bending or kinking of a wire produces a significant restoring force. When a wire rope bends it generally returns to the same state once the bend is removed. This is not the case for cables made of synthetic filaments. The alignment issues occur with or without a jacket around the strand. Further, the alignment differential increases as the size of the cable increases. The reader will thereby perceive the importance of keeping a synthetic cable and/or its component strands straight in the vicinity of the end when creating a termination.

It is also important to maintain alignment between a strand and the anchor used to terminate it. The region where the filaments exit the anchor (often called the "neck" of the anchor) is significant. If the freely flexing portion of the synthetic-filament strand is bent with respect to the anchor when loaded, a large stress riser will form in the neck region. The freely flexing portion bends quite easily and it is not able to withstand significant lateral loads without badly reducing the overall strength of the strand/termination. Maintaining the desired alignment for these large cables is a more complex problem—with processing and performance issues increasing with increasing scale. The present invention presents a solution to these problems.

The present invention seeks to improve both processing and performance issues. The main processing advantage of the invention is the fact that it allows the use of well-developed and repeatable "small cable" termination technologies to be used with larger cables. The main performance advantages of the invention result from the fact that "small cable" terminations produce good repeatability and good overall strength, along with the fact that non-uniform loads are decoupled and/or alignment between the strands and their respective terminations are improved. The invention "collects" multiple small cable terminations into a single collector, thereby allowing the advantages of a small cable termination to exist in a larger cable.

BRIEF SUMMARY OF THE PRESENT INVENTION

The present invention comprises a method for terminating a multi-stranded, non-parallel cable. The method includes: (1) dividing the cable into smaller components which are in the size range suitable for the prior art termination technology; (2) creating a termination on the end of each of the smaller components; (3) providing a collector which reassembles the individual terminations back into a single unit; and (4) maintaining reasonable alignment between the terminations and the smaller components while the terminations and the collector are in a connected state.

The collector acts as a unified termination for the cable as a whole. However, each strand or group of strands has been cut, positioned, and locked into a relatively small termination for which strand/anchor alignment is maintained. The relatively large cable is broken into smaller components so that consistent and repeatable termination technology known for use in small cables can be applied to create a termination for a much larger cable. The collector reassembles the smaller components in a manner that minimizes bending stresses in the transition from each anchor to its respective strand/strand-group/sub-strand.

Figure 1:
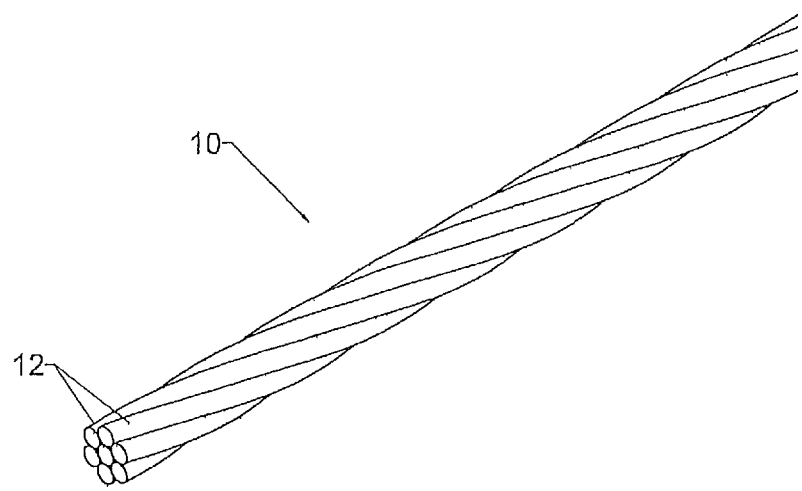
FIG. 1 is a perspective view, showing a prior art cable made of seven strands.
Figure 2:
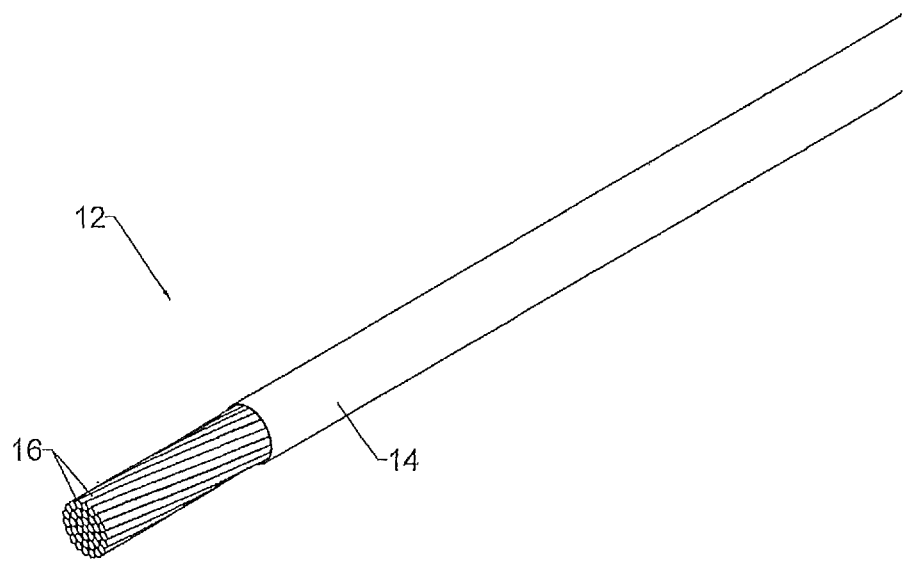
FIG. 2 is a perspective view, showing an individual strand comprised of many synthetic filaments encased within a jacket.
Figure 3:
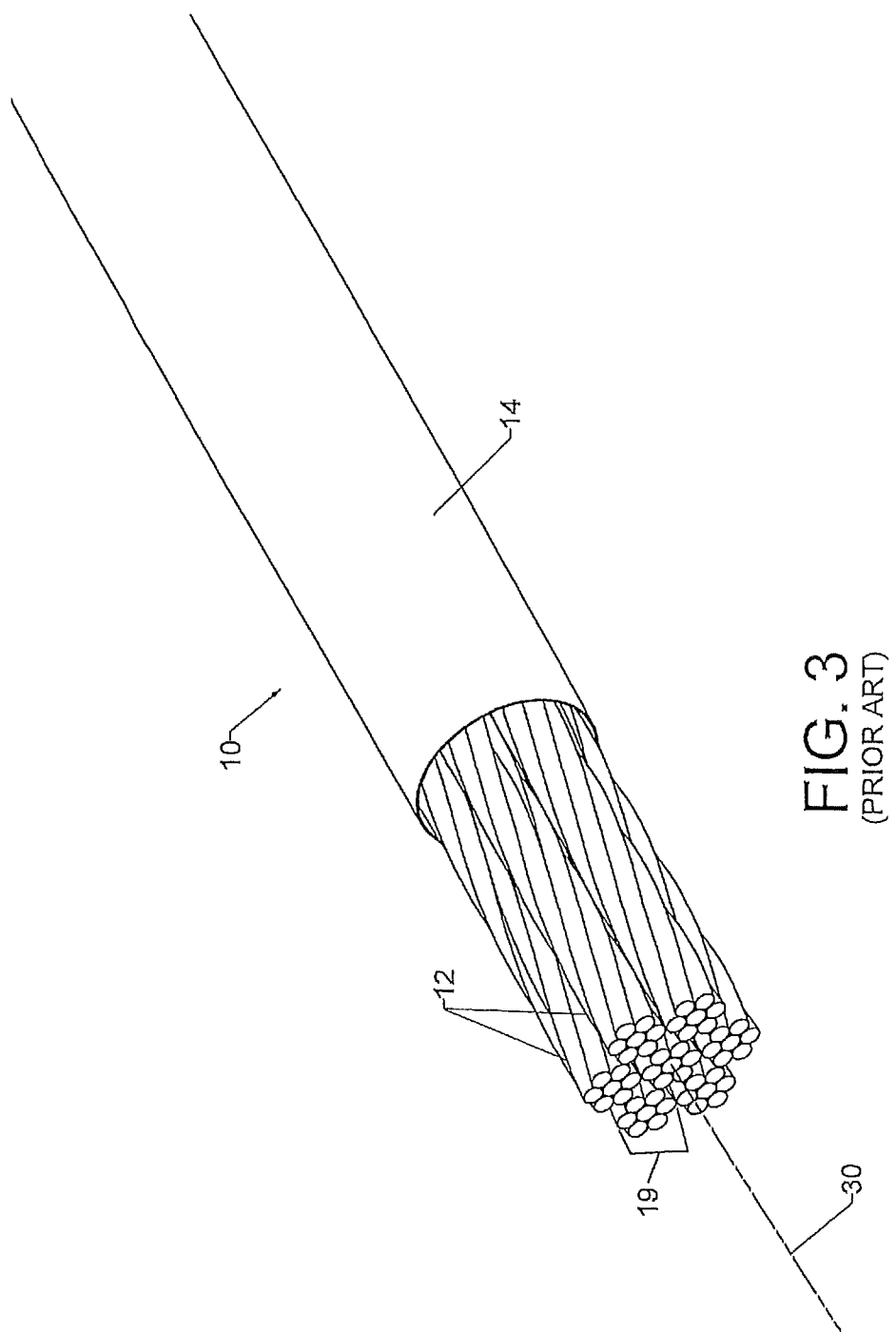
FIG. 3 is a perspective view, showing a prior art cable made of seven strand groups, each of which strand groups includes seven strands wrapped in a helical pattern.
Figure 4:
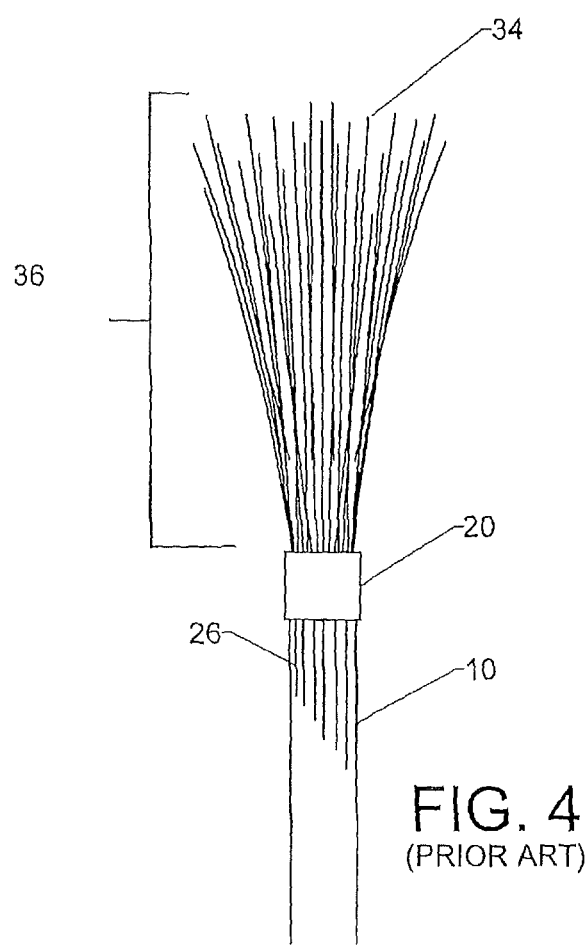
FIG. 4 is an elevation view, showing a small synthetic cable during the prior art termination process.
Figure 5:
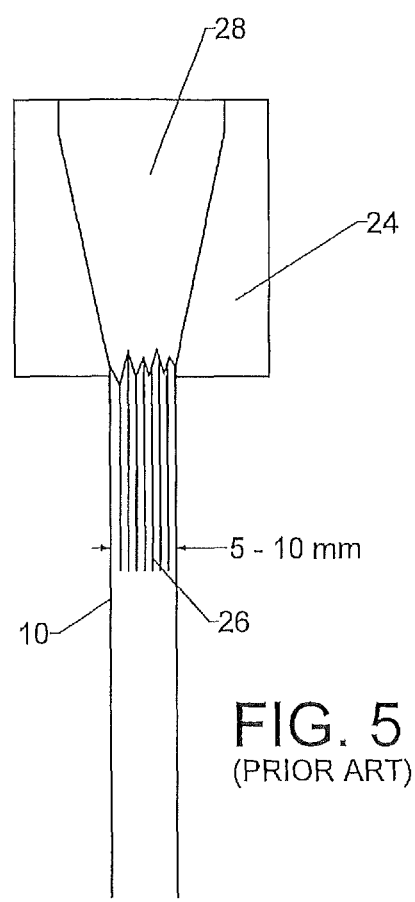
FIG. 5 is a sectional elevation view, showing the synthetic cable of FIG. 4 after it has been potted into an anchor.
Figure 6:
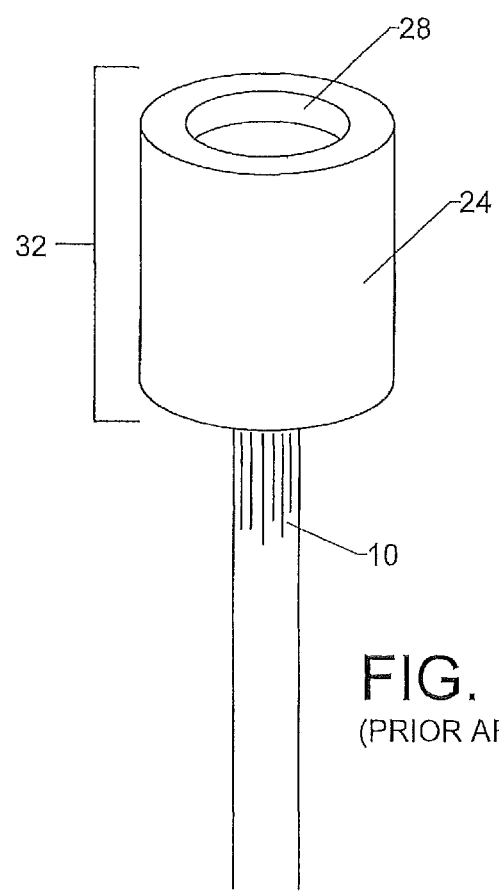
FIG. 6 is a perspective view, showing the completed termination.
Figure 7:
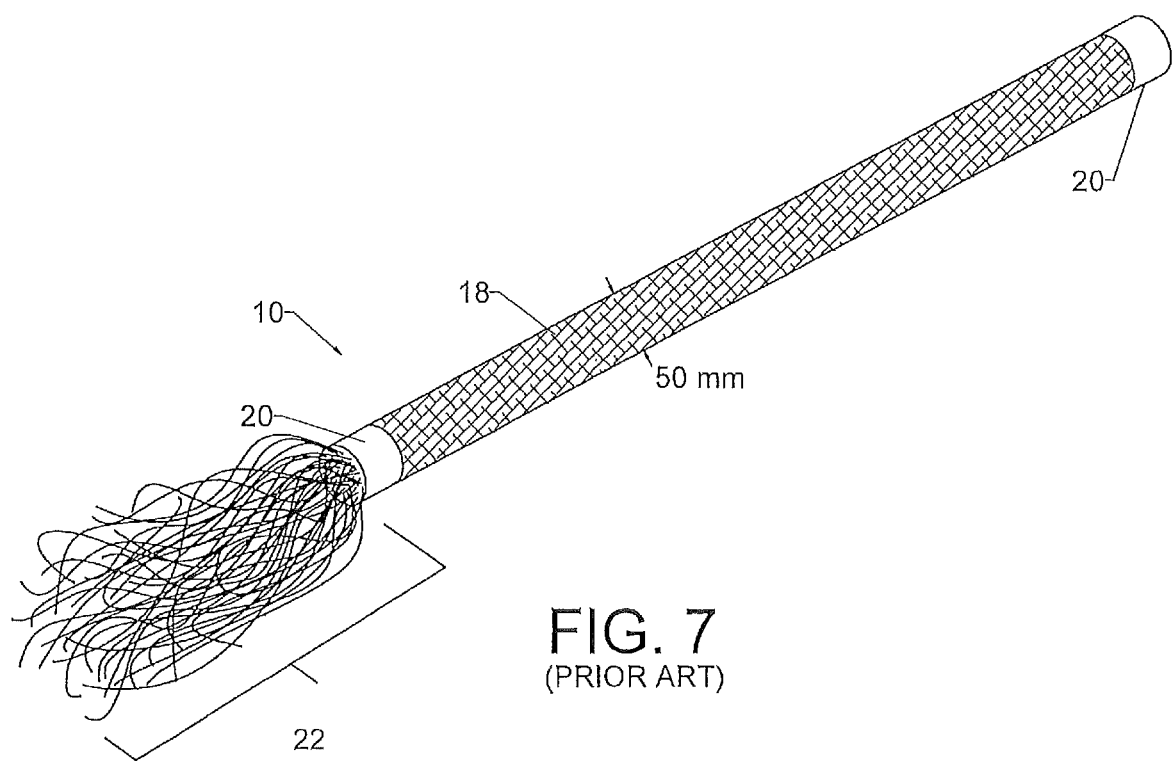
FIG. 7 is a perspective view, showing a larger prior art cable.
Figure 8:
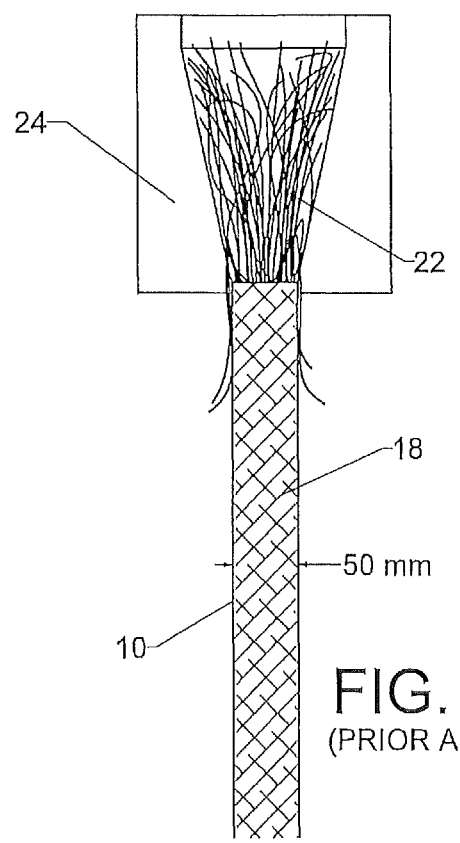
FIG. 8 is a sectional elevation view, showing an attempt to use prior art termination technology on the cable of FIG. 7.
Figure 9:
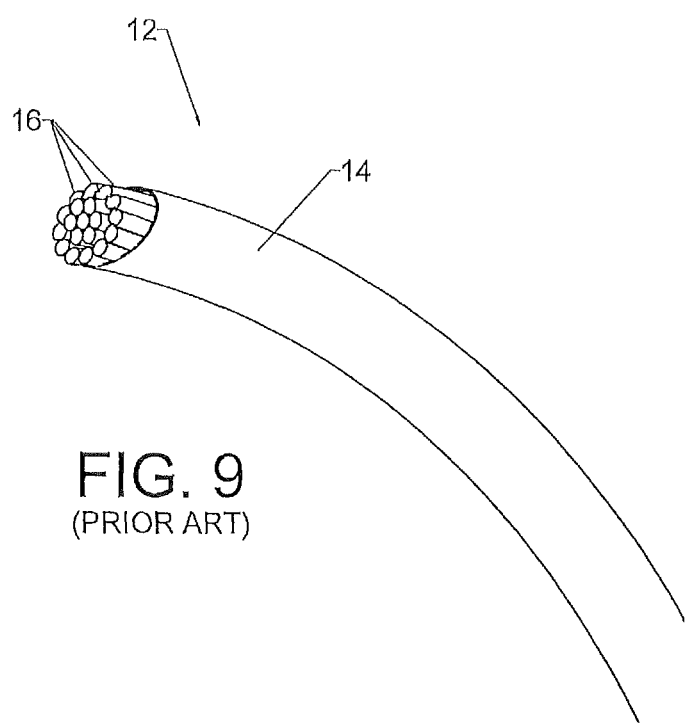
FIG. 9 is a perspective view, showing a prior art strand being flexed.
Figure 10:
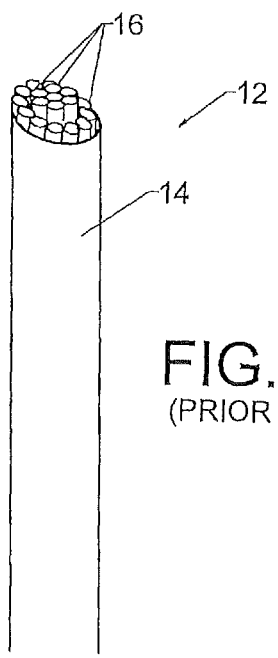
FIG. 10 is a perspective view, showing the prior art strand of FIG. 9 after it has been straightened.

REFERENCE NUMERALS IN THE DRAWINGS 10 cable
12 strand
14 jacket
16 filament
18 braided jacket
19 strand group strand group
20 binder
22 loose portion
24 anchor
26 free filaments
28 potted region
30 central axis
32 termination
34 splayed filaments
36 set-back distance
40 cut end
42 collector
44 anchor receiver
46 cable receiver
48 attachment feature
50 centerline
52 alignment fixture
54 threaded engagement
56 coupler
58 threaded engagement
62 stem
64 ball
66 spherical socket
68 channel
70 core
72 pivot joint
74 pivot joint
76 receiver
78 fastener
80 socket
82 slot
84 threaded shaft
86 alignment channel
88 alignment fixture
90 core strand
92 injection passage
94 strand cavity
96 arcuate shoulder
98 arcuate shoulder
100 internal passage
102 bolt
104 fillet
106 flexible extension
108 cone
110 loading flange
112 hex head
114 threaded engagement
116 nut

DETAILED DESCRIPTION OF THE INVENTION

The inventive method can be used for a synthetic cable of almost any size, but it is most advantageous for cables having a medium to large diameter (as the processing and performance benefits over the prior art increase with increasing scale). In the context of synthetic cables, this would be an overall diameter of approximately 15 mm or more. The invention is most advantageous for use with cables having at least a partially non-parallel structure. However, the invention offers some advantages for cables having even a 100% parallel construction. While many variations are possible, FIGS. 11 through 19 explain the basic steps of the process.

Figure 11:
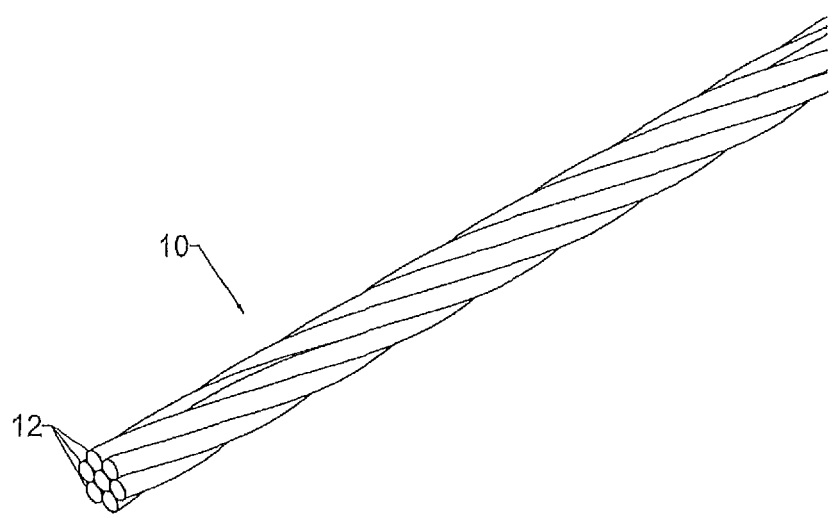
FIG. 11 is a perspective view of a prior art synthetic cable.

FIG. 11 shows a seven strand synthetic cable. In this construction, six outer strands 12 are helically wrapped around a single core strand. The resulting cable 10 therefore has a substantially non-parallel construction, meaning that many that the outer strands are not parallel to the central axis of the cable as a whole. The present invention seeks to attach anchors to a substantial portion of the strands and in most instances attach anchors to all of the load-bearing strands. In the specific example of FIG. 11, anchors will be attached to the six outer strands but not the core strand (which will be attached directly to another component instead).

Figure 12:
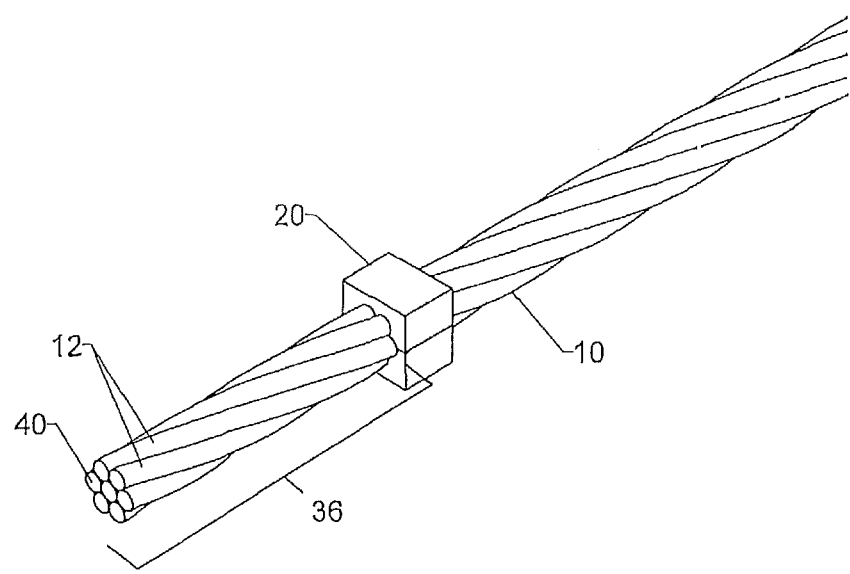
FIG. 12 is a perspective view, showing the cable of FIG. 11 after a binder has been added.
Figure 34:
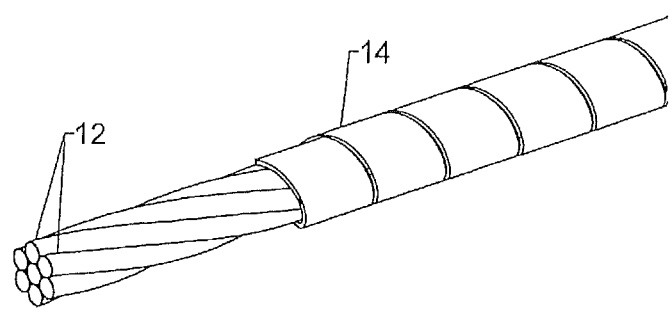
FIG. 34 is a perspective view, showing the use of a helical wrap to create a jacket.

FIG. 12 shows the same cable with binder 20 in position a set-back distance 36 from cut end 40. The binder is simplistically represented as two blocks clamped together over the cable. It may assume many different forms, so long as it limits or reduces the ability of the individual strands 12 to move with respect to each other during processing (in larger cables it may restrict the movement of strand groups or groups of strand groups). The binder may assume many different forms, including tape, string, an extruded or over-braided jacket, and even an adhesive infused into a limited section of the cable. FIG. 34 shows one example of a binder. Jacket 14 is helically wrapped around all of or a portion of the cable. The jacket in this example is an adhesive tape capable of applying some compression to the strand, thereby limiting filament movement during processing by reducing unwanted strand movement. In some instances a strand will come with a binder already installed in the form of a compressive jacket. In those cases a binder will not need to be added. Rather, a portion of the existing binder in proximity to the termination may need to be removed.

Figure 13:
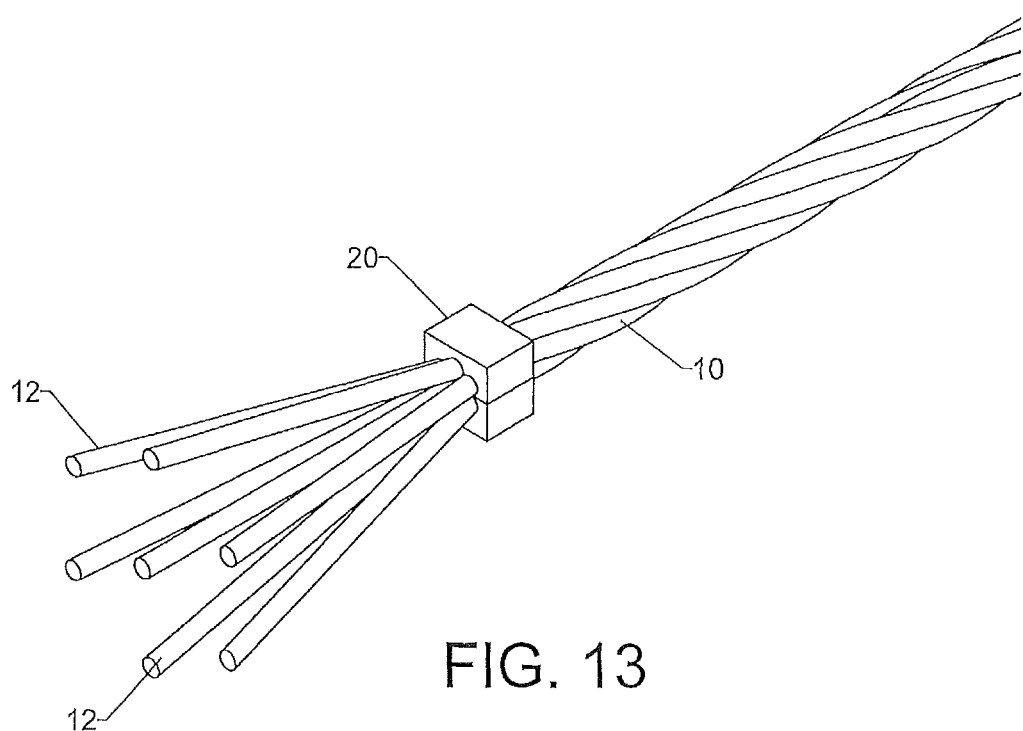
FIG. 13 is a perspective view, showing the separation of the strands between the cut end of the cable and the binder.

It is not practical to add a termination to the cut end of each of the individual strands 12 while they are still grouped together. FIG. 13 shows the same assembly after the cut ends of the six outer strands have been urged apart and away from the core strand. Once urged apart, each individual strand is essentially a small synthetic cable to which the prior art termination methods can be applied (such as potting).

Figure 14:
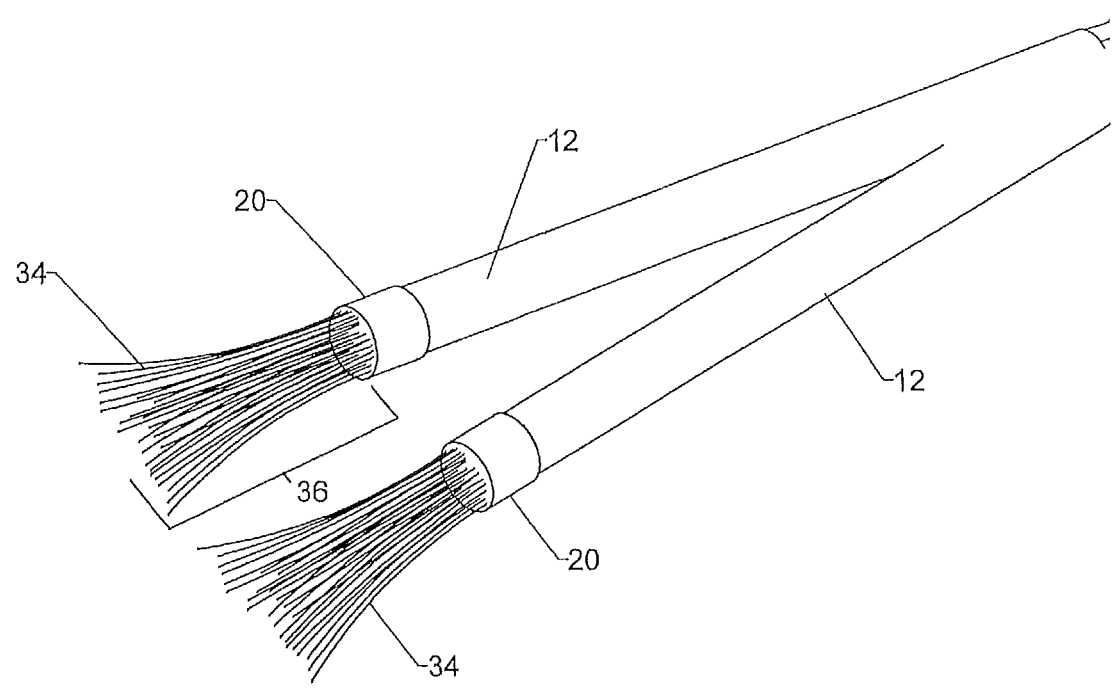
FIG. 14 is a perspective view, showing the addition of a binder to each strand of the cable of FIG. 13.

FIG. 14 shows a closer view of the ends of the strands 12. A binder 20 has been applied to each—with the binder being separated from the cut end by set-back distance 36. These smaller binders, like the larger binder used for the cable itself, are intended to help maintain filament alignment during processing. Strand 12, for example, may be a braided strand group requiring some form of added binder to prevent unwanted filament movement during processing. The free filaments are placed within an anchor cavity and splayed to create splayed filaments 34. Liquid potting compound is then placed within the cavity and allowed to harden. Of course, if the binder was a part of the strand structure and applied to the entire strand (such as an extruded thermoplastic jacket) a length of jacket material would simply be removed from the end.

Figure 15:
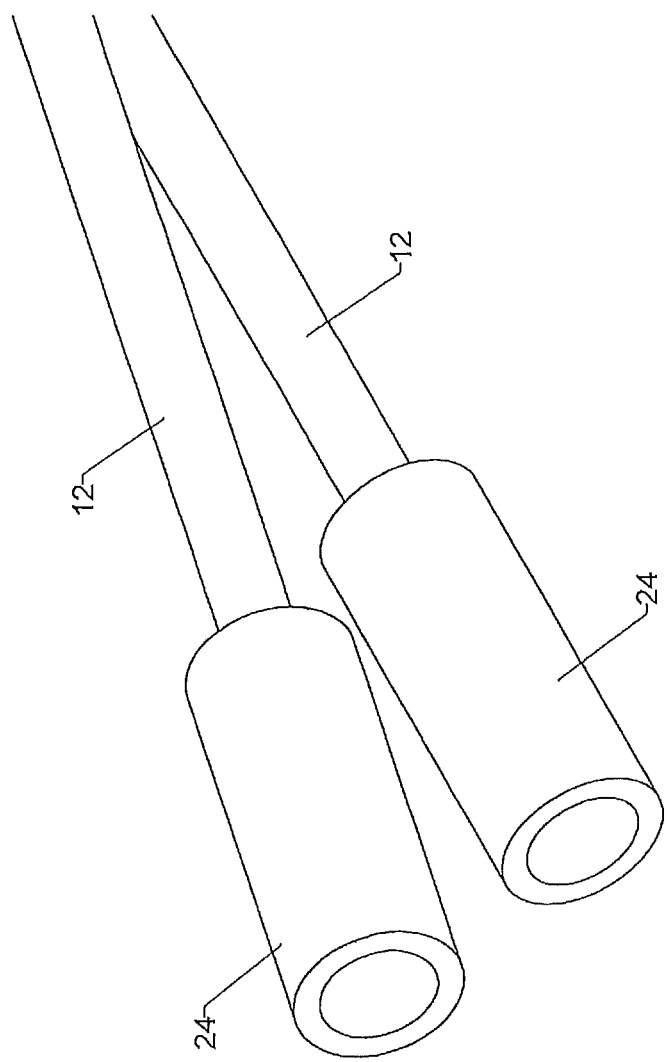
FIG. 15 is a detailed perspective view, showing the addition of an anchor to each of the individual strands of the cable of FIG. 14.

FIG. 15 shows the same strands 12 after anchors 24 have been installed on all except core strand 90. Binder 20 has been applied to core strand 90 but it has not yet been potted (for reasons which will be explained subsequently). The reader will observe that the outer strands retain a somewhat-relaxed helical configuration even when they have been urged away from the core strand. This fact is important. If the anchors were reoriented to be parallel with the overall centerline of the cable, then each of the outer strands would have to bend as it entered the anchor. As described previously, such a bend under load is undesirable. Once the anchor is attached, the alignment between the filaments entering the anchor and the anchor itself is established. Movement may then be allowed. However, while the anchors and the collector are in a connected state, proper alignment is preferably maintained between the filaments, the anchor, and the collector.

The present invention divides the cable into smaller constituents in order to apply repeatable and strong "small cable" termination techniques to the smaller constituents. The smaller constituents are then recombined using a collector. The nature of this collector is important as it must accomplish the recombination without introducing unwanted bending stresses or strand misalignment.

Figure 16:
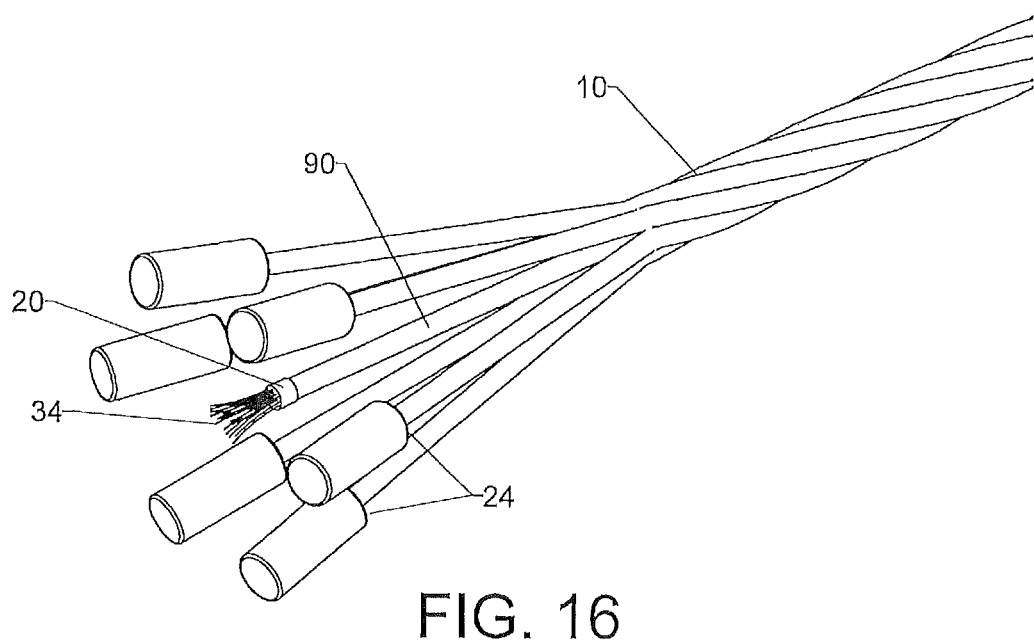
FIG. 16 is a perspective view, showing the cable of FIG. 14 after an anchor has been added to each individual strand.
Figure 17:
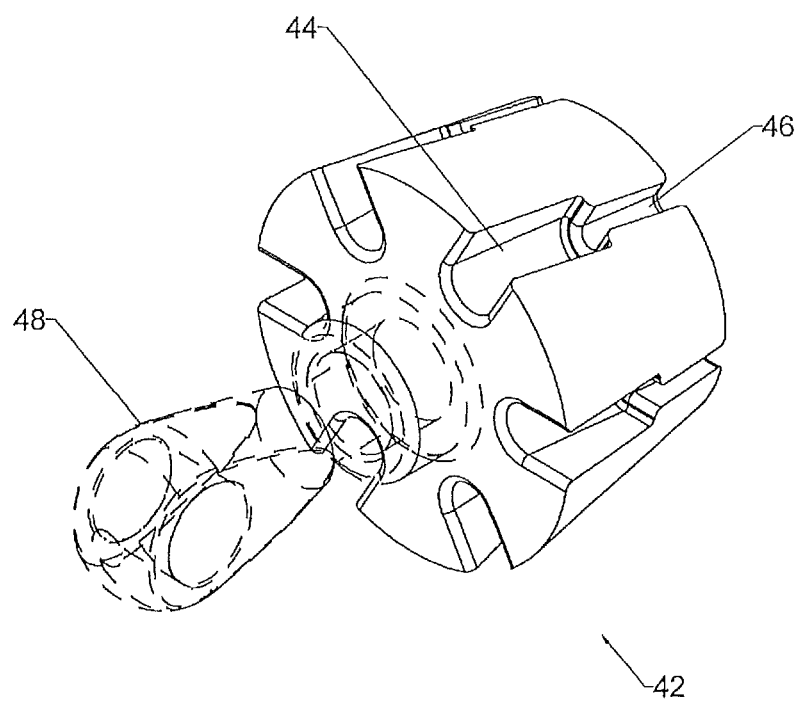
FIG. 17 is a perspective view, showing a collector configured for use with the cable of FIG. 16.

FIG. 17 shows a collector 42 which is configured for use with the cable of FIG. 16. The collector includes six anchor receivers 44 around its perimeter. Each anchor receiver 44 is joined to a cable receiver 46. Both the anchor receivers 44 and the cable receivers 46 intersect the exterior of the collector.

Figure 18A:
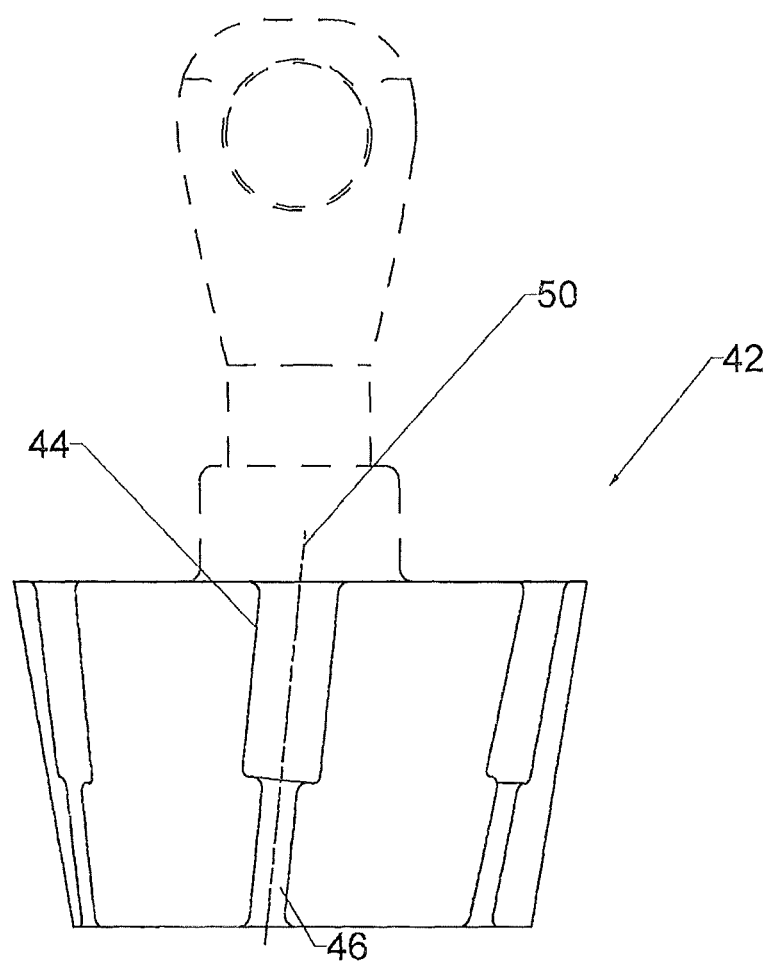
FIG. 18A is an elevation view, showing the collector of FIG. 17.
Figure 18B:
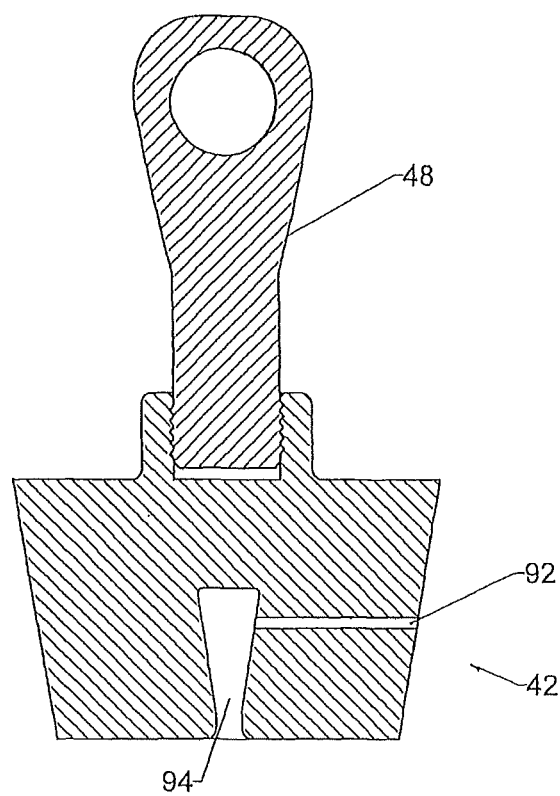
FIG. 18B is a sectional elevation view, showing the collector of FIG. 17.

FIG. 18 is an elevation view of collector 42. The reader will observe that each anchor receiver and cable receiver is concentric about a centerline 50. The reader will also observe that each centerline 50 is angularly offset from the axis of radial symmetry for the collector as a whole. This offset makes each anchor receiver and cable receiver parallel to the helical path of one of the outer strands it is positioned to receive. A helical path has a fixed "helix angle" at any given cross section along its length. If the centerline 50 of each anchor receiver 44 is aligned with this helix angle, then the anchor placed within that anchor receiver will be aligned with the strand to which it is attached.

The reader should bear in mind that some small errors in the angles employed are permissible. For example, depending on the cable design, a 1-5 degree misalignment will not typically degrade the cable's performance to any significant extent. However, the goal is to maximize alignment between each anchor and the strand to which it is attached.

FIG. 18A shows a sectional elevation view through collector 42—taken through the center of attachment feature 48. Strand cavity 94 is included in the portion of the collector opposite the attachment feature. This strand cavity is configured to receive the splayed strands of core strand 90 so that the core strand can be terminated directly into the collector itself.

Injection passage 92 is provided so that liquid potting compound can be injected into strand cavity 94. The air within the cavity can be vented out the open end of the strand cavity during the potting process. Optionally, a separate vent can be provided. The reader should note that the concept of attaching some strands to separate anchors and at least one strand directly to the collector itself is somewhat unusual. It would be more typical for this embodiment to provide anchors for all strands and attach the anchors to the collector. However, the attachment of one or more strands directly to the anchor is certainly within the scope of the present invention. Also within the scope of the present invention is the concept of employing different attachment mechanisms for different strands being gathered into a single collector.

For example, one strand could be attached to the collector via its anchor sliding into a pocket in the collector. A second strand could be attached to the collector via its anchor having a threaded stud that passes through a hole in the collector—with a nut being attached to the protruding portion of the threaded stud. The connections between anchor and collector could occur in multiple configurations and at multiple different levels. A first ring of anchors could be attached to a portion of the collector nearest the freely-flexing portion of the cable. A second ring of anchors could be attached to the collector in a position further away from the freely flexing portion of the cable. This could require stands of slightly differing lengths, but the need for differing lengths can be accommodated in the manufacturing and assembly processes.

Figure 19:
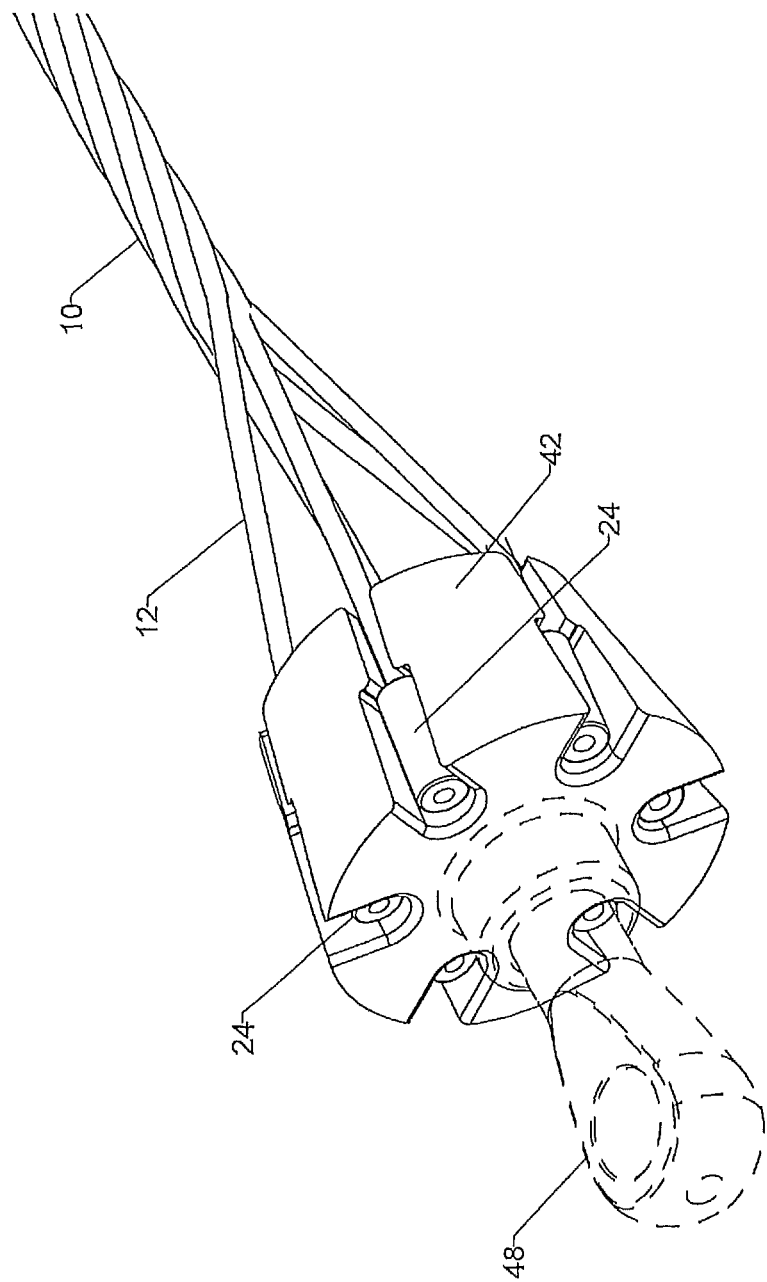
FIG. 19 is a perspective view, showing the collector and the cable assembled together.

Turning to FIG. 19, the assembly of the collector to the cable for this particular embodiment will now be explained in detail. Collector 42 is placed in the center of the six outer strands and moved toward the tightly wrapped portion of the cable (Binder 20—as shown in FIG. 13—is preferably left in place to help stabilize the strands during this process). Returning to FIG. 17, the reader will note that if the collector is moved toward the tightly wrapped portion of the cable until anchors 24 lie around attachment fixture 48, the user can press the strands inward and into the six cable receivers 46. If the collector is then urged away from the tightly wrapped portion of the cable (in the direction of attachment feature 48) then anchors 24 will slide into anchor receivers 44 and become trapped therein.

FIG. 19 shows this state. Each anchor 24 is trapped within collector 24. From the geometry seen, it is apparent that so long as tension is maintained on the cable the anchors will stay in place. Some additional attachment or entrapment features or mechanisms—such as an overall enclosure body, mounting brackets, interlocking features, adhesives or clips can be used to ensure that they remain in position even when no tension is present. FIG. 19 obviously represents a simple version of a collector, but it serves well to illustrate the operative principles of the invention. Those skilled in the art will recognize that the embodiment of FIG. 19 illustrates one possible approach to connecting the anchors to the collector, and that many other approaches will occur to someone skilled in mechanical design. For example, the collector may simply include a series of holes while the anchors may include a threaded shaft sized to fit through these holes and then be secured with a nut.

With the collector and the outer strands now joined in a suitable fashion, core strand 90 can be potted into strand cavity 94 within the collector. The completed assembly then acts as a unified whole. Still looking at FIG. 19, the reader should note that the individual strands are aligned with each individual anchor 24 at the point where the freely flexing portion of the strands enters the anchor. This feature is important to reducing the unwanted bending stresses. The order of operations is not particularly significant. One could just as easily pot the core strand into the collector first.

Figure 20:
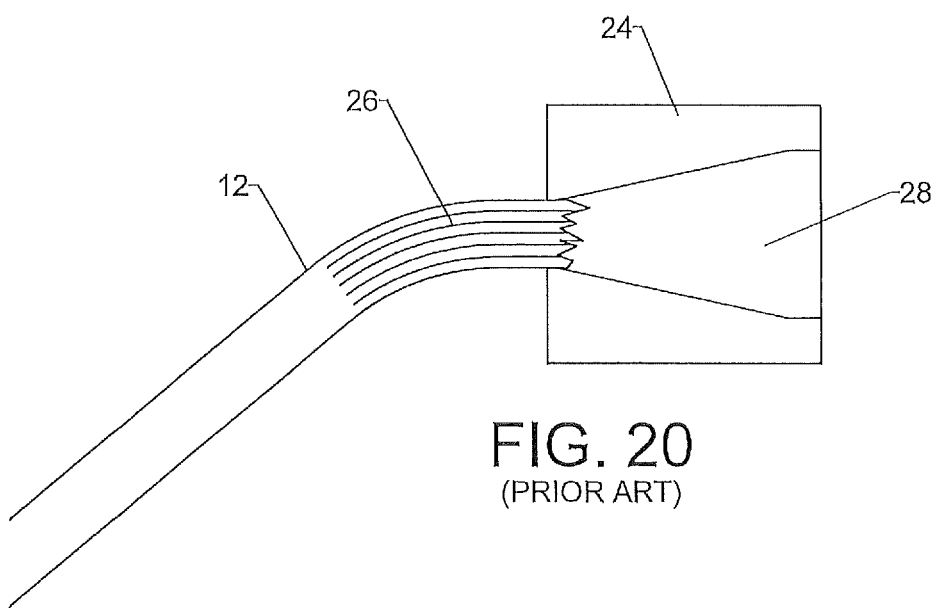
FIG. 20 is a sectional view, showing a strand misaligned with its anchor.

FIG. 20 shows a sectional view through a prior art anchor 24 with a potted portion 28 of strand 12 locked therein. If the strand is bent as shown with respect to the anchor, one may easily see how stress will rise in the "throat" region where free filaments 26 pass into potted region 28. The reader will also perceive the advantages of the collector shown in the preceding figures in this respect. It eliminates or at least largely reduces such bending stresses.

Returning to FIG. 17, the reader should be aware that attachment feature 48 can assume many different forms. Anything that facilitates the connection of the collector to an external component serves this purpose. An eye is shown. The concept of an attachment feature would also include an externally threaded boss, a boss with a hole having internal threads, external threads on the outer surface of the collector itself, multiple threaded holes on the collector, and even a simple flange on the collector which could bear against an external surface.

Figure 39:
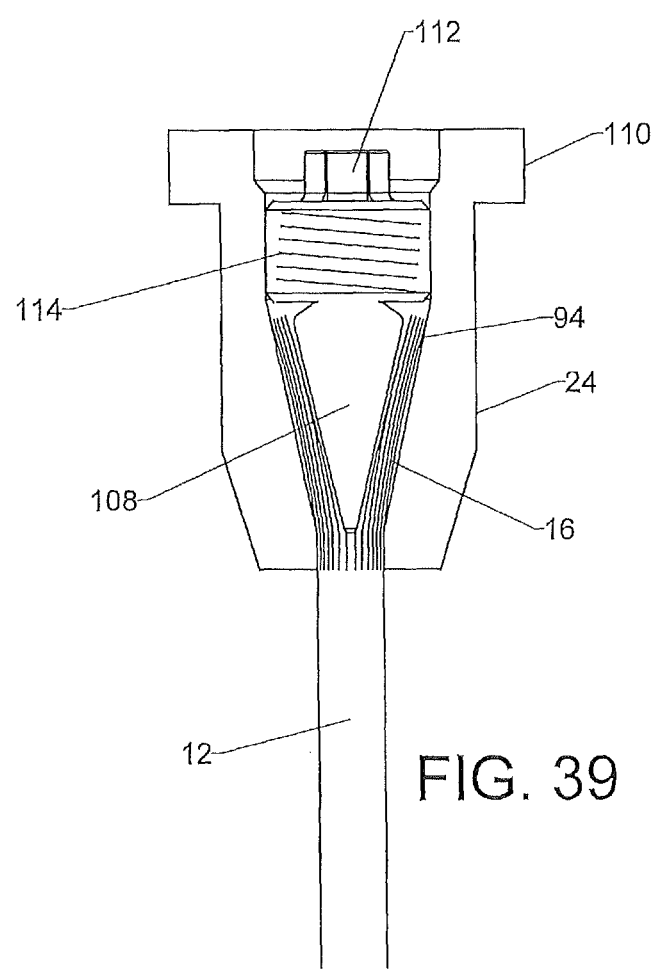
FIG. 39 is a sectional view, showing a spike-and-cone anchor configured for use in the present invention.

During the process of locking each strand into an anchor it is preferable to maintain the proper alignment. The termination process shown in the examples provided is a typical potting process, but any termination process may be used. Other common examples are mechanical interlocks such as a "spike and cone" fastener, external compressions devices, and hybrid resin/compression devices. FIG. 39 shows a spike-and-cone termination configured for use in the present invention. Anchor 24 includes a tapered strand cavity 94 as for the potted versions. However, rather than securing the filaments within the cavity using potting compound, the filaments are compressed and frictionally engaged by screwing cone 108 into the cavity. The strands are further compressed and frictionally engaged by applying tension to the cable (and thereby further "seating" the cone). Cone 108 is linked to anchor 24 by threaded engagement 114. The user employs a separate tool to engage and turn hex head 112—thereby securing the anchor to the end of strand 12. Any suitable feature may be used to transmit tensile forces from the anchor to the collector. An external thread is one example. Loading flange 110 is another example.

For any of these approaches, alignment within each of the terminated strand group components is important (particularly in the region where the flexible filaments interact with the inflexible anchor). The desired alignment can be created in a wide variety of ways.

Figure 21:
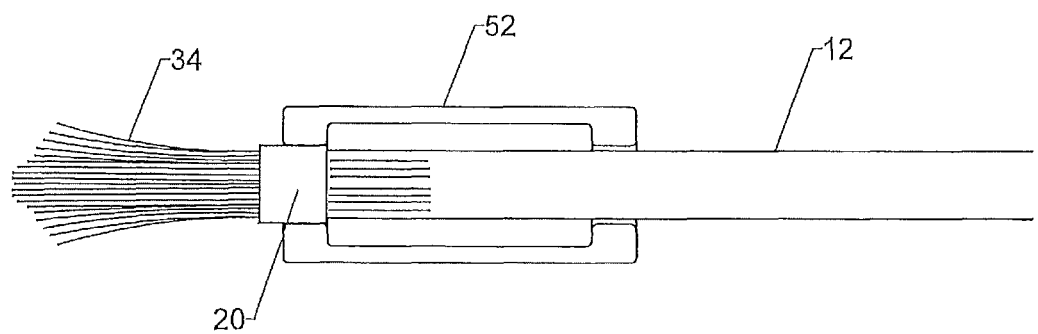
FIG. 21 is an elevation view, showing an alignment fixture for use in the potting process.

Another type of alignment that may be added in the practice of the present invention is the alignment of the filaments within a strand and the anchor being attached to the strand during the process of creating the termination. FIG. 21 shows a simplified depiction of an alignment fixture. Alignment fixture 52 is designed to engage strand 12 in the freely flexing portion and to engage binder 20. This fixture holds the binder and the strand in proximity to splayed filaments 34 in alignment. The alignment fixture preferably restricts relative movement in all six degrees of freedom (X, Y, Z, roll, pitch, and yaw).

Figure 22:
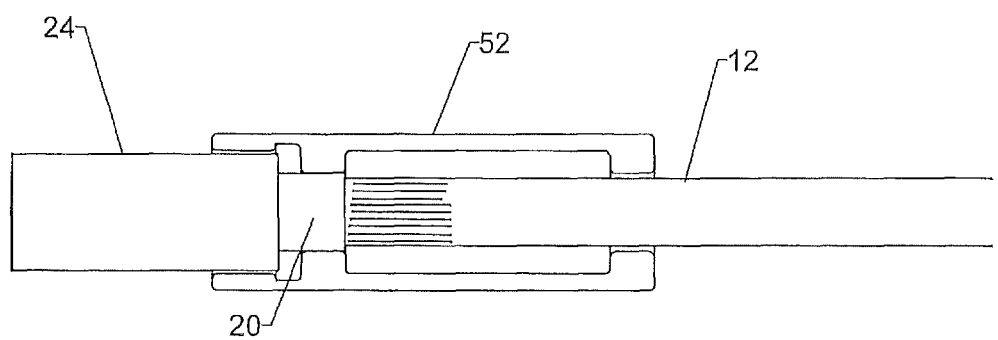
FIG. 22 is an elevation view, showing an alignment fixture for use in the potting process.

A more comprehensive version of alignment fixture 52 is shown in FIG. 22. This version grips the freely flexing portion of strand 12, binder 22, and anchor 24. Placing the fixture as shown ensures alignment of the critical components during the termination process. If for example potting compound is used, the alignment fixture is preferably retained in position until the potting compound has transitioned into a solid. Although the use of an alignment fixture during the process of affixing an anchor to the end of a cable offers advantages in certain circumstances, the reader should bear in mind that the present invention may be carried out without the use of such a fixture. In many embodiments, no alignment fixture will be used.

Of course, one the termination process for an individual strand is completed the fixture can be removed. While one would not wish to repeatedly bend the strand after the anchor is in place, it is much more able to withstand bending.

Figure 23:
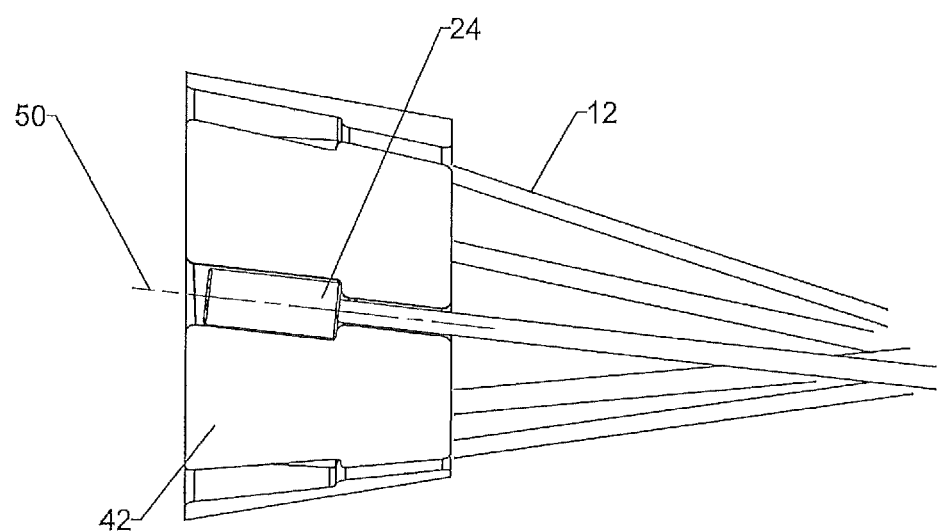
FIG. 23 is an elevation view, showing the assembly of FIG. 19.

Once suitable terminations are added to the strands, the strands are placed within a collector. FIG. 23 shows a view of the anchors 24 after they have been placed in collector 42 (for the specific embodiment of FIGS. 12-19). The reader will note again how the angular displacement of centerline 50 generally aligns the anchor with the free portion of the strand. This minimizes bending stresses and allows the maximum performance (in terms of tensile strength) from the completed assembly.

The embodiment shown in FIGS. 11-19 serves to illustrate the components and exemplary steps of the proposed invention. However, many different and widely varied embodiments will be needed in actual applications, and the embodiment that is suitable for a particular application will depend greatly on the nature of the cable to be terminated and the overall termination design. FIGS. 24-27 show another embodiment that is useful for cases where the strands on the cable's exterior are routed and collected in one manner and the strands near the cable's core are routed and collected in a different manner.

Figure 24:
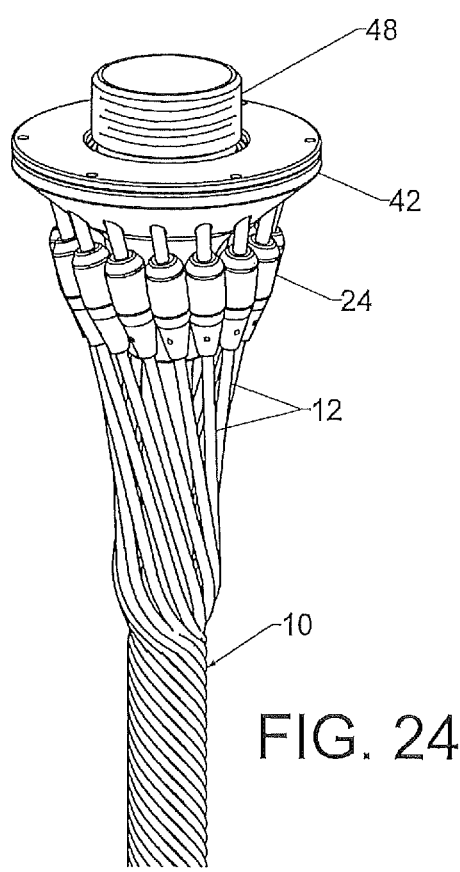
FIG. 24 is a perspective view, showing another embodiment of the invention.

Cable 10 in FIG. 24 has a relatively large core consisting of a braided strand group that is independently jacketed and wrapped by 16 helical strands. The two major components (core strands and helical strands) respond differently when tension is applied to the cable. Tension on the core strands with this particular construction will not generally produce a resulting torque. Tension on the outer helical strands, on the other hand, will produce significant torque and will also tend to vary the helix angle. This phenomenon can make the determination of the precise angular offset for each anchor within collector 42 difficult. In the embodiment shown, the problem is solved by using ball and socket joints for each anchor. These allow the helix angle to "float" within the range of motion allowed by the ball and socket joint.

Collector 42 has a central section which includes attachment feature 48 (In this case a large boss with an external thread). The collector also has a large flange which is used to attach the numerous anchors in a radial array. Each anchor is attached to the flange using a ball and socket joint so that the angle between the collector and each individual strand can vary as needed to prevent bending.

The reader will note in this example that the collector gathers strands of differing sizes and configurations. The braided core strand or strand group may be potted as a whole into an internal cavity within the collector (or potted into another object that attaches to the collector). The helical strands are significantly smaller and each lies in its own unique orientation with respect to the collector.

Figure 25:
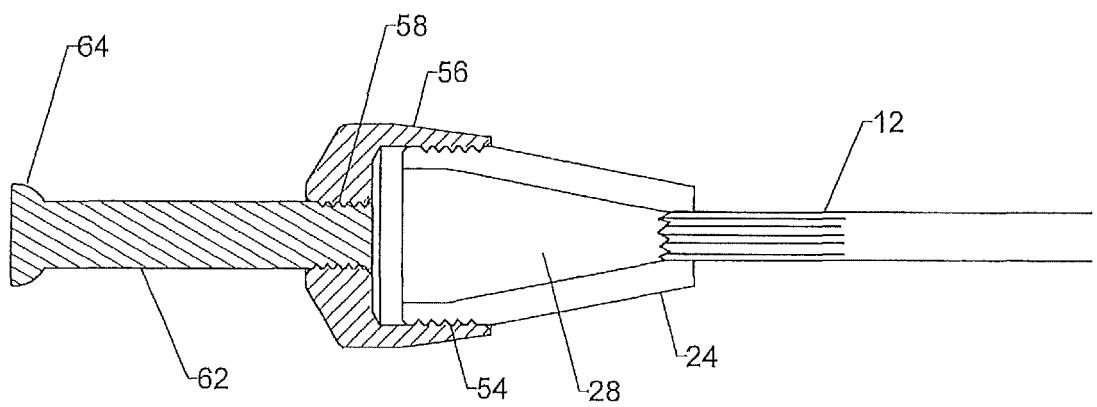
FIG. 25 is a sectional view, showing details of the stem ball assembly used in the embodiment of FIG. 24.

FIG. 25 is a detailed sectional view through one termination used for a helical strand in the embodiment of FIG. 24. Strand 12 is potted into anchor 24 as explained previously. Anchor 24 is joined to coupler 56 by threaded engagement 54. Stem 62 is joined to coupler 56 by threaded engagement 58. Finally, ball 64 is provided on the end of stem 62.

Figure 26:
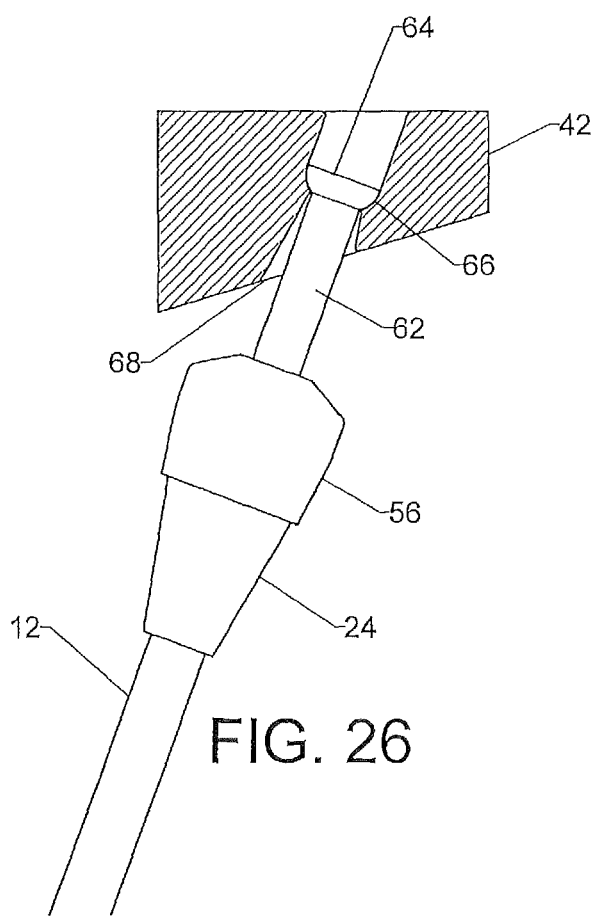
FIG. 26 is a sectional view, showing the stem ball of FIG. 26 placed in the collector.

FIG. 26 shows the assembly of FIG. 25 attached to the collector. Stem 62 is placed into spherical socket 66 with its threaded portion sticking out through channel 68. Ball 64 bears against spherical socket 66 in collector 42. The threaded portion of stem 62 is threaded into coupler 56 to complete the assembly. The reader will note how the ball and socket joint allows the angle between strand 12 and collector 42 to vary within a modest range. The reader will also note how the threaded engagement between stem 62 and coupler 56 allows the tension of each of the helically wrapped strands to be adjusted individually.

Figure 27:
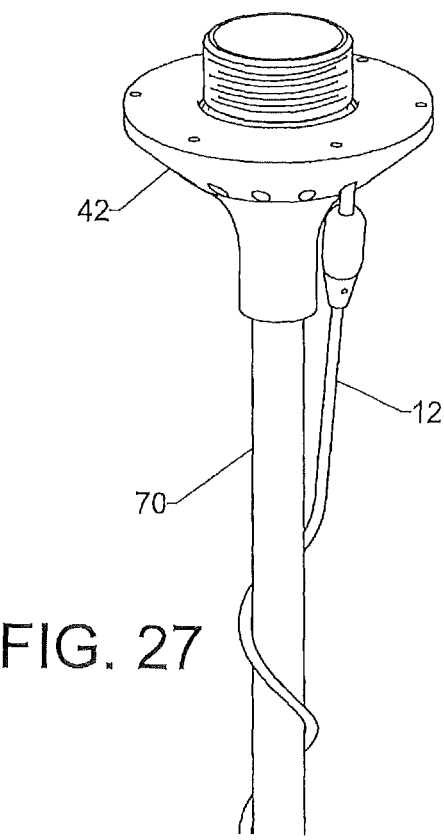
FIG. 27 is a perspective view, showing the assembly of FIG. 24 with most of the helically wrapped strands removed.

FIG. 27 shows the assembly with all but one of the helically wrapped strands removed in order to aid visualization. Core 70 is potted collectively into a central cavity within collector 42. Each helical strand 12 is then attached to the collector 42 using the previously described ball and socket joints. One the appropriate tension is applied to the helical strands, the cable will act as a unified whole.

Adding a tensioning or length adjustment feature to better align certain strand positions may be preferred in some cases. For example, those skilled in the art will realize that both the particular cable used and the termination method(s) used will entail some reasonable manufacturing tolerances, and these tolerances may need to be accounted for in locking the terminations into the collector. The inclusion of adjustment features allows the proper balancing of loads among the strands. Among other advantages, the ability to individually adjust the tension on each of the helical strands allows the termination to compensate for manufacturing tolerances and ensure that the cable is loaded correctly and evenly.

It is even possible to "load set" such an assembly. For some complex assemblies it is preferable to apply a significant amount of tension and then readjust the tension adjustments on each of the helical strands. This operation may even be performed iteratively for a large cable. The ball and socket joints allow the helical strands to adjust themselves so that alignment is maintained between the freely flexing portions of the strands and the anchor into which each strand is terminated.

Core 70 has been illustrated as a unified collection of parallel strands or filaments. In other embodiments the core may be a grouping of strands of differing configuration (braided, twisted, etc.) and even differing sizes.

Figure 28:
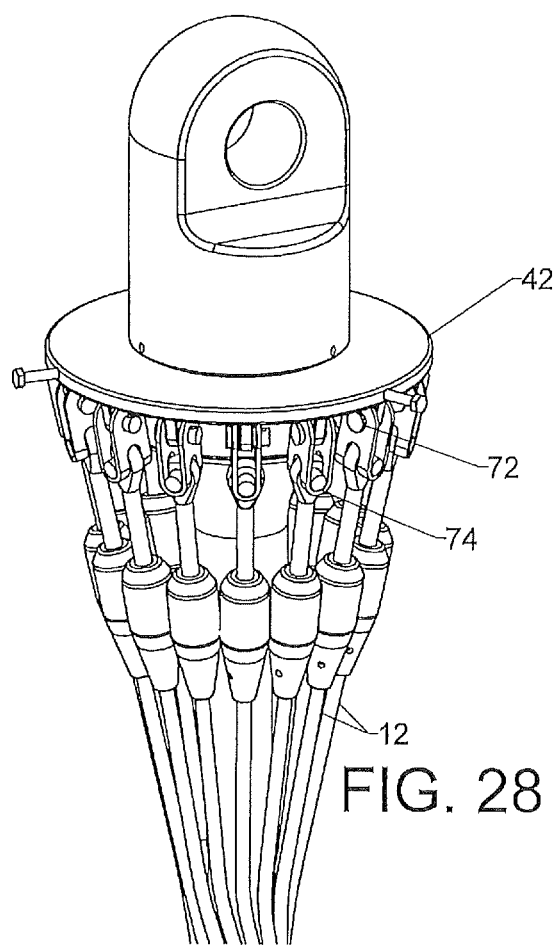
FIG. 28 is a perspective view, showing another embodiment for the collector.

Of course, other mechanical attachment devices can be used to ensure the desired alignment between the individual strands and the anchors that are used to attach them to the collector. FIG. 28 shows another embodiment. In this embodiment, each anchor for the exterior strands is attached to collector 42 by a joint which pivots in two perpendicular axes. The reader will observe how each attachment includes pivot joint 72 and pivot joint 74. These two pivot joints accommodate any needed angular displacement to ensure that each strand enters its anchor in an aligned state.

Figure 29:
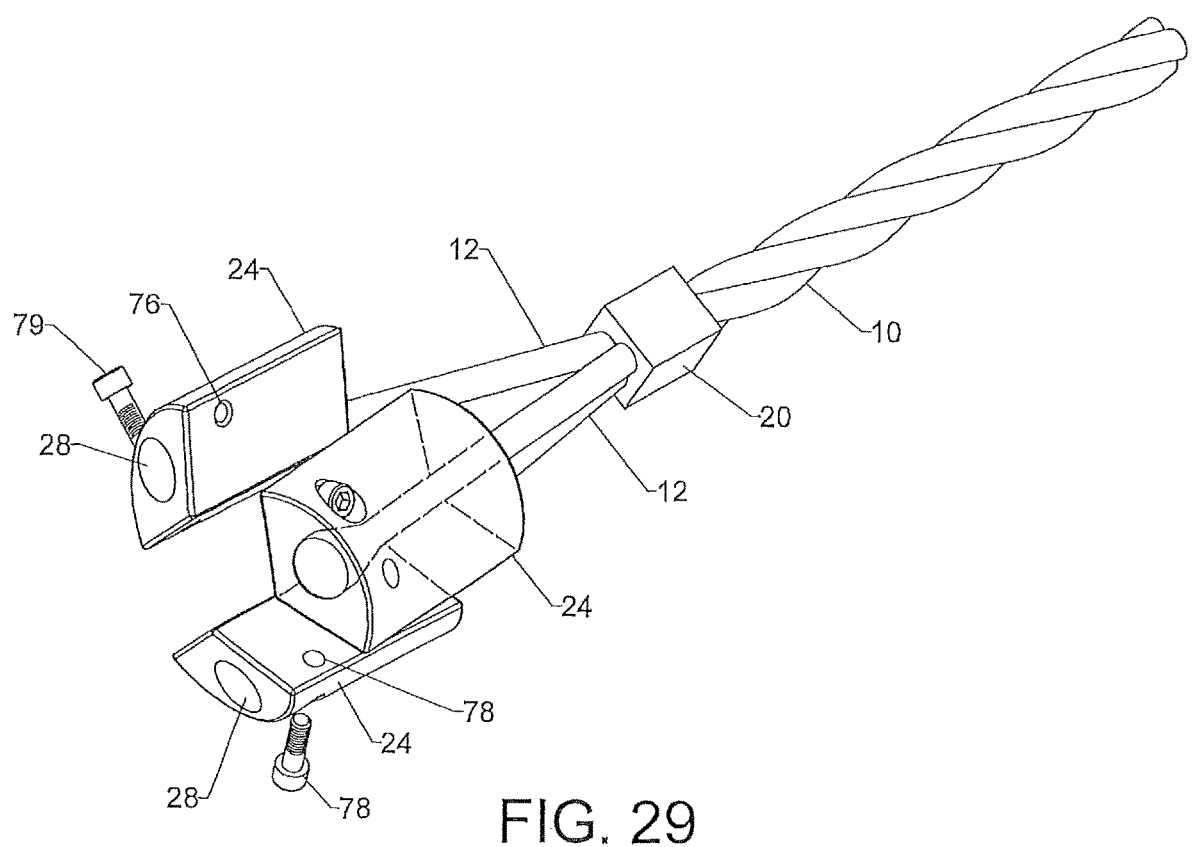
FIG. 29 is an exploded perspective view, showing yet another embodiment in which the anchors combine to actually form the collector.
Figure 30:
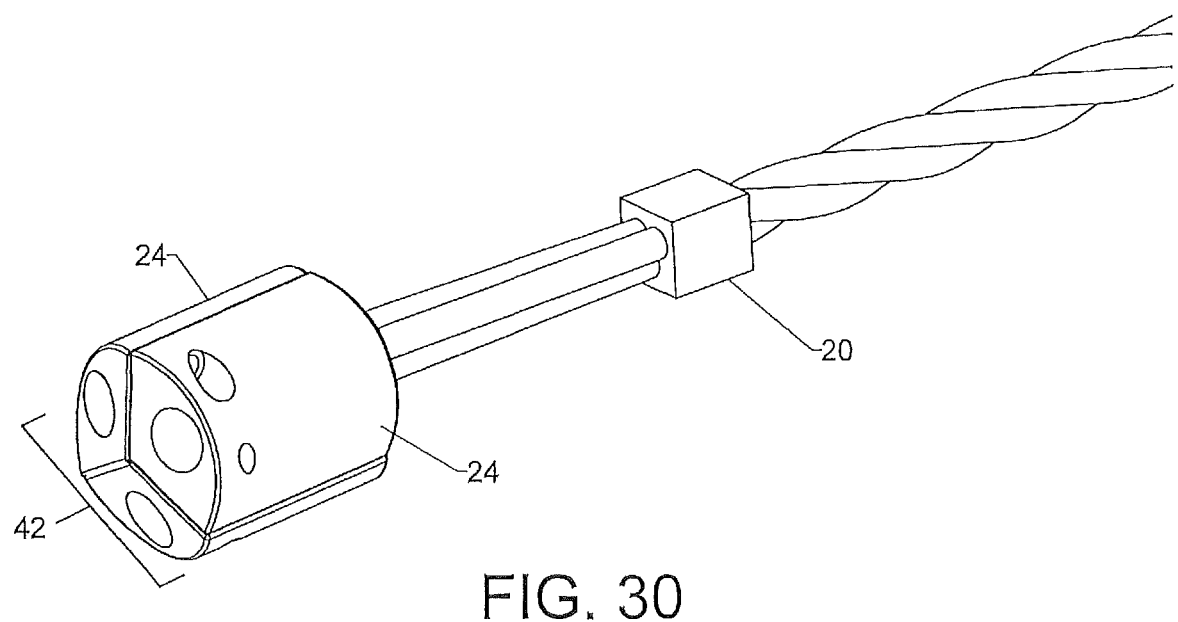
FIG. 30 is a perspective view, showing the embodiment of FIG. 29 in an assembled state.

FIGS. 29 and 30 show a completely different approach to the unification of the anchors and the collector. In this embodiment, the anchor is a portion of the collector. In FIG. 29, the reader will observe that three individual strands 12 are each potted into an anchor 24. Each anchor 24 includes attachment features allowing it to be joined to a neighboring anchor. Each anchor includes a threaded receiver 76 and a through-hole sized to accommodate a fastener 78. Three such fasteners 78 can be used to join the three anchors 24 together into a unified collector.

FIG. 30 shows this embodiment with the three anchors 24 joined to form a collector 42. Binder 20 may be left in place to help secure the transition between the helically wrapped portion of the cable and the straight strands leading to collector 42. Optionally, the potting cavity within each anchor could be given an angular offset so that the helical path of the strands is generally maintained into the anchors themselves.

Figure 31:
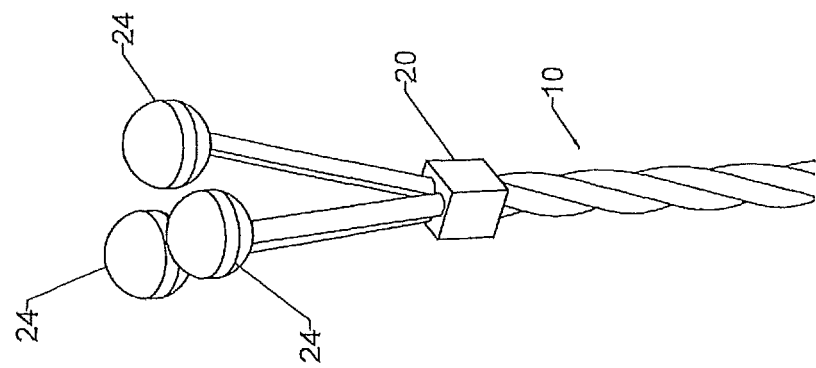
FIG. 31 is a perspective view, showing still another embodiment for the collector.
Figure 31:
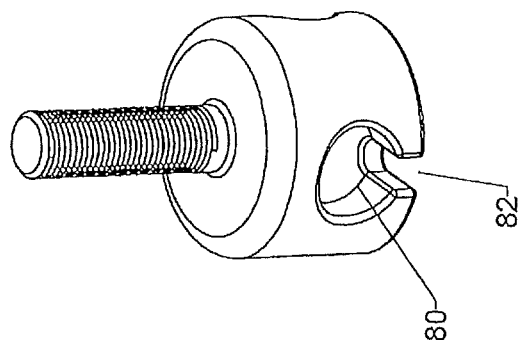
Figure 31:
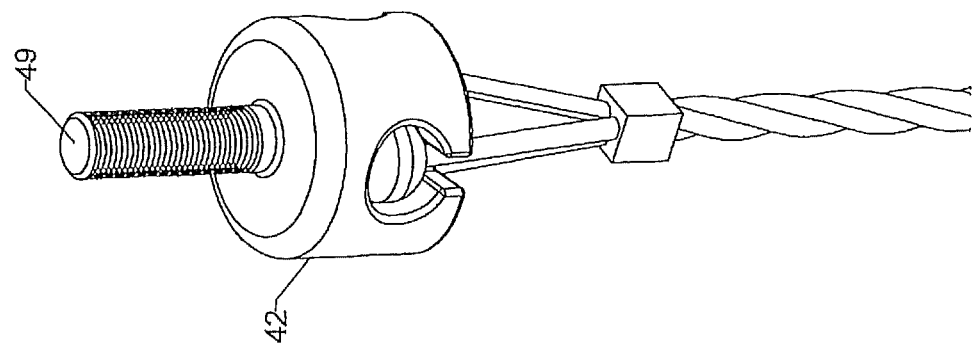

FIG. 31 shows still another embodiment for the anchors and the collector. The cable in this case is a twisted assembly of three strands (having no core). This "core-less" construction is similar to many braided ropes. In FIG. 31, each anchor 24 has a spherical exterior. Collector 42 has three sockets 80 and slots 82. The three anchors 24 are placed into the three sockets 80, with the strands passing through slots 82. When tension is applied to the cable anchors 24 will naturally be urged toward the center of collector 42 and will thereby be retained in position.

An advantage of de-coupling the strands from the core is the ability to create independent alignment at the strand level. Several examples of this advantage have been described previously, including the ability maintain a helix angle for an anchor connected to a helically-wrapped strand. It is also possible to provide strand-level alignment for other geometries, including nested and counter-rotating helices.

The same principles apply to braided ropes, twisted ropes, served ropes, and any other constructions where tensions and/or alignment may vary between strands. This de-coupling of load components can create significant performance advantages, particularly in large ropes with non-uniformly parallel strands and/or dynamic applications where loads may vary from strand to strand during use.

It is also possible to provide an embodiment where a helical strand path is gradually modified into a path which is parallel to the overall centerline of the cable. A gradual transition from a helical path to a straight one can be made without introducing unacceptable stress. However, it has traditionally been difficult to create the desired gradual transition. The present invention is able to create such a gradual transition using many different features and combinations of features, and this is a significant advantage.

Figure 32:
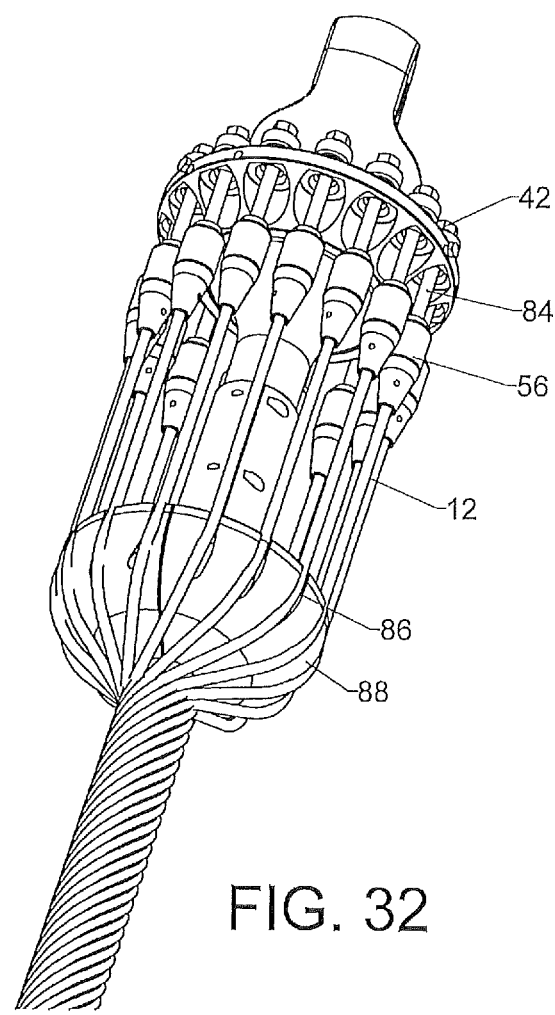
FIG. 32 is a perspective view, showing still another embodiment for the collector.

FIG. 32 shows an embodiment in which helically-wrapped strands are gradually transitioned to a parallel path and aligned with an anchor (as the anchor lies within the collector) before being joined to a collector. Collector 42 includes alignment fixture 88. The reader will observe that alignment fixture includes a plurality of radially-spaced alignment channels 86. Each alignment channel gradually straightens from a helical path into a parallel one so that rotational cable movements (torsion) can be unified or otherwise restricted to axial movements at the termination of each strand.

In the embodiment shown, alignment fixture 88 is preferably spaced a distance part from the attachment flange on the collector itself. Each helically wrapped strand is passed through an alignment channel before being connected to the flange. This form of strand positioning prevents each strand from altering its path at the anchor point during loading. As with other forms of strand alignment, those skilled in the art will know that such positioning can be carried out in many different ways. Each anchor is attached to the flange using a tension nut on the end of a threaded shaft 84. This feature allows the tension on each individual strand to be adjusted independently.

Figure 33:
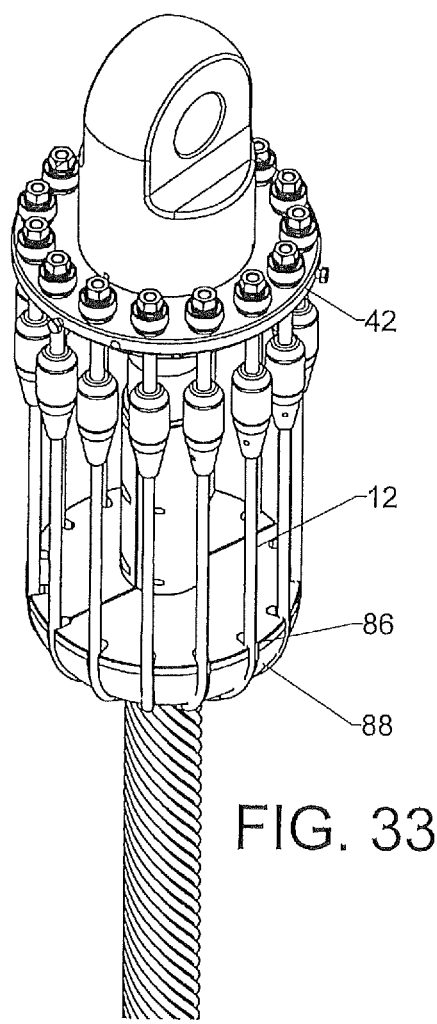
FIG. 33 is a perspective view, showing the embodiment of FIG. 32 from another vantage point.

FIG. 33 shows the same assembly from a different vantage point. The reader will note that each tension nut is accessible. An attachment feature is provided in the center of coupler 42. As for the prior embodiments, the completed assembly acts like a unified whole. A user need only attach the cable using the attachment feature without having any concern for the operation of the internal components. In this example it would typically be preferable to include additional retaining or entrapment features to the strands to help ensure they maintain position under low load. An example of this would be an attached plate with holes that the strands are pre-fed into prior to terminating.

FIG. 33 also provides a good example of how the tension on each strand may be individually adjusted. If even tension is desired, a torque wrench may be used to sequentially tighten the nuts shown. Another approach is to provide an annular "washer-style" load cell beneath each nut. Each of these load cells can then transmit strain information to a data collection unit. This information assists in properly tightening the cable and in monitoring the cable's loading conditions over time.

The ability to individually adjust the tension on the strands allows some of the inventive process to be simplified. As explained previously, it is generally preferable to straighten a portion of a cable before it is cut to length. It is also preferable to provide a binder that secures the cable and prevents unwanted slippage between filaments and strands during the cutting and terminating processes. While the use of a binder on a straight cable is certainly ideal, the ability to individually tighten the strands allows these steps to be eliminated in some circumstances. One can simply cut the cable in whatever state it presently lies. The terminations are then added to each strand and gathered into the collector.

It is very likely that placing a load on the cable will then produce significantly different strand-to-strand loads. However, a user can iteratively tighten the tension-adjusting devices in order to even out the load. Thus, even though the cable may start in an "unbalanced" state, the ability to individually adjust the tension on each strand allows the user to achieve balance.

In the illustrations of FIGS. 32 and 33, the strands are exposed as they travel from alignment fixture 88 to collector 42. This is desirable for purposes of illustration, but may be undesirable in actual operation. For example, the assembly of FIG. 32 might be used for a large mooring line. Such a line might be dragged laterally across an abrasive concrete surface while in use. Thus, it is preferable to contain the strands, anchors, and other hardware within a protective enclosure. A shroud may be provided for this purpose. In the embodiment of FIG. 32, the shroud might assume the form of a cylindrical enclosure encompassing the strands, anchors, couplers, etc. The shroud might be part of the collector or might be a separate piece that is secured in place using bolts or other means.

In some embodiments the collector itself may contain a portion of the guiding geometry and the alignment fixture may contain a portion of the guiding geometry. The alignment function can be performed in the collector, the anchor, a separate alignment fixture, or some combination among these.

Figure 37:
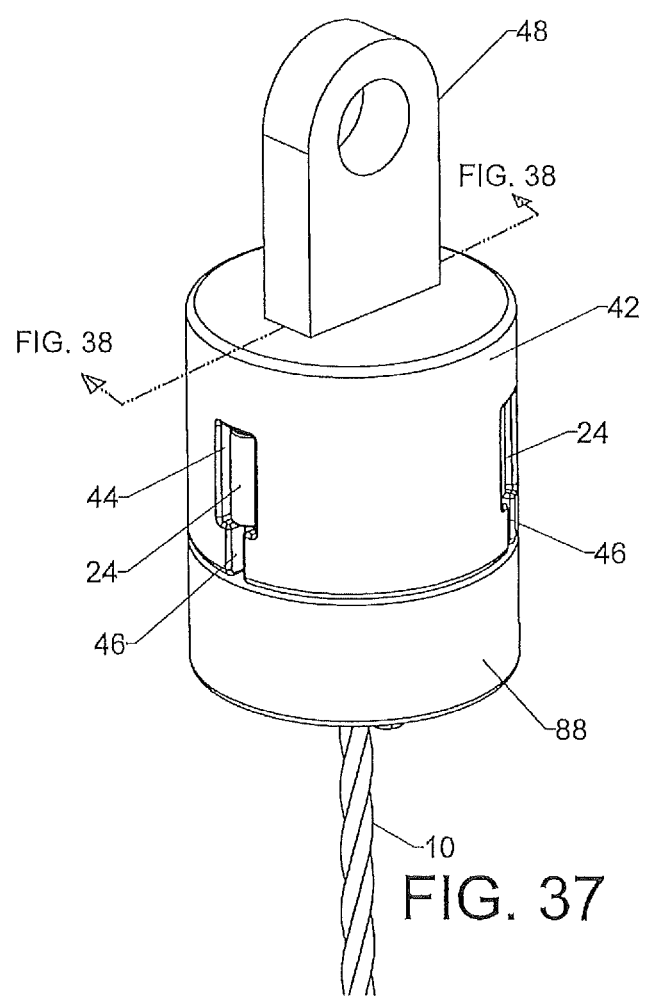
FIG. 37 is a perspective view, showing another embodiment of a collector and an alignment fixture.
Figure 38:
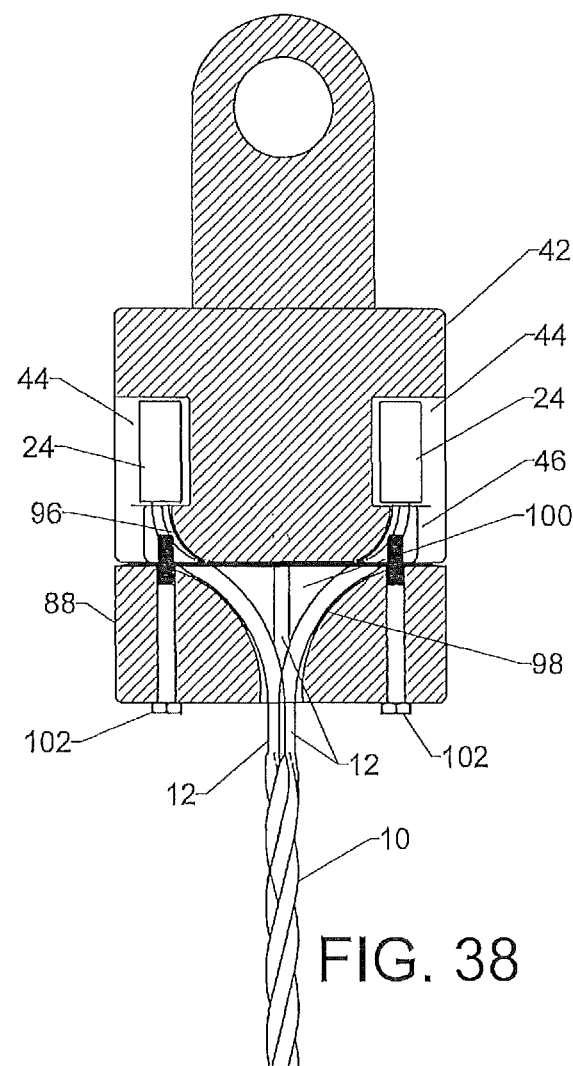
FIG. 38 is a sectional view of the assembly of FIG. 37, showing some internal details.

FIGS. 37 and 38 show an embodiment in which some of the alignment function occurs in the collector and some occurs in a separate alignment fixture. In FIG. 38, cable 10 consists of four twisted strands (with no core). An anchor 24 is affixed to the end of each strand. Collector 42 collects all four anchors 24 and transmits a tensile load via attachment fixture 48.

Collector 44 includes four anchor receivers 44 (two are visible in FIG. 37). A cable receiver 46 extends out the bottom of each anchor receiver. FIG. 38 shows a sectional view through the center of the assembly of FIG. 37. The assembly process starts with alignment fixture being disconnected from collector 42. The four anchors are passed through the lower portion of internal passage 100 through collector 42. Each anchor is then placed in an anchor receiver 44 (sliding each strand laterally inward through a cable receiver 46). The reader will note that each anchor receiver includes a shelf that transmits load to the anchor. In other words, if tension is placed on the cable the anchor cannot move downward in the orientation shown in the view.

Once the four anchors are in place, alignment fixture 88 is moved upward against the base of collector 42. The alignment fixture is preferably secured to the base of the collector using conventional devices—such as bolts 102.

Collector 42 and alignment fixture 88 contain features intended to guide the cable through a smooth transition as described previously. Each cable receiver 46 includes an arcuate shoulder 96. Likewise, internal passage 100 in alignment fixture 88 contains arcuate shoulder 98 (The arcuate shoulder is a revolved profile that defines the shape of the internal passage). These two arcuate shoulders—in combination—guide each strand from its exit from the anchor to the point where it joins the twisted cable. A smooth transition is thereby created.

Figure 35:
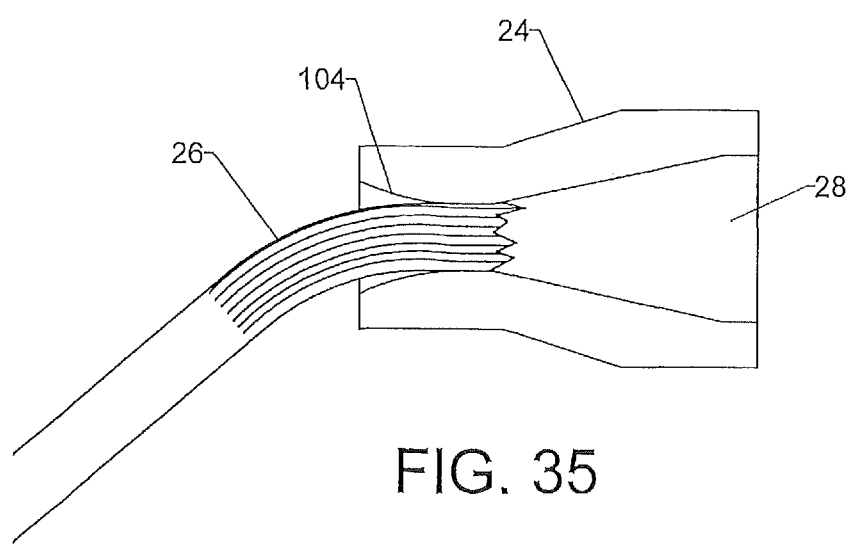
FIG. 35 is a sectional view, showing the inclusion of a fillet near the throat of an anchor.
Figure 36:
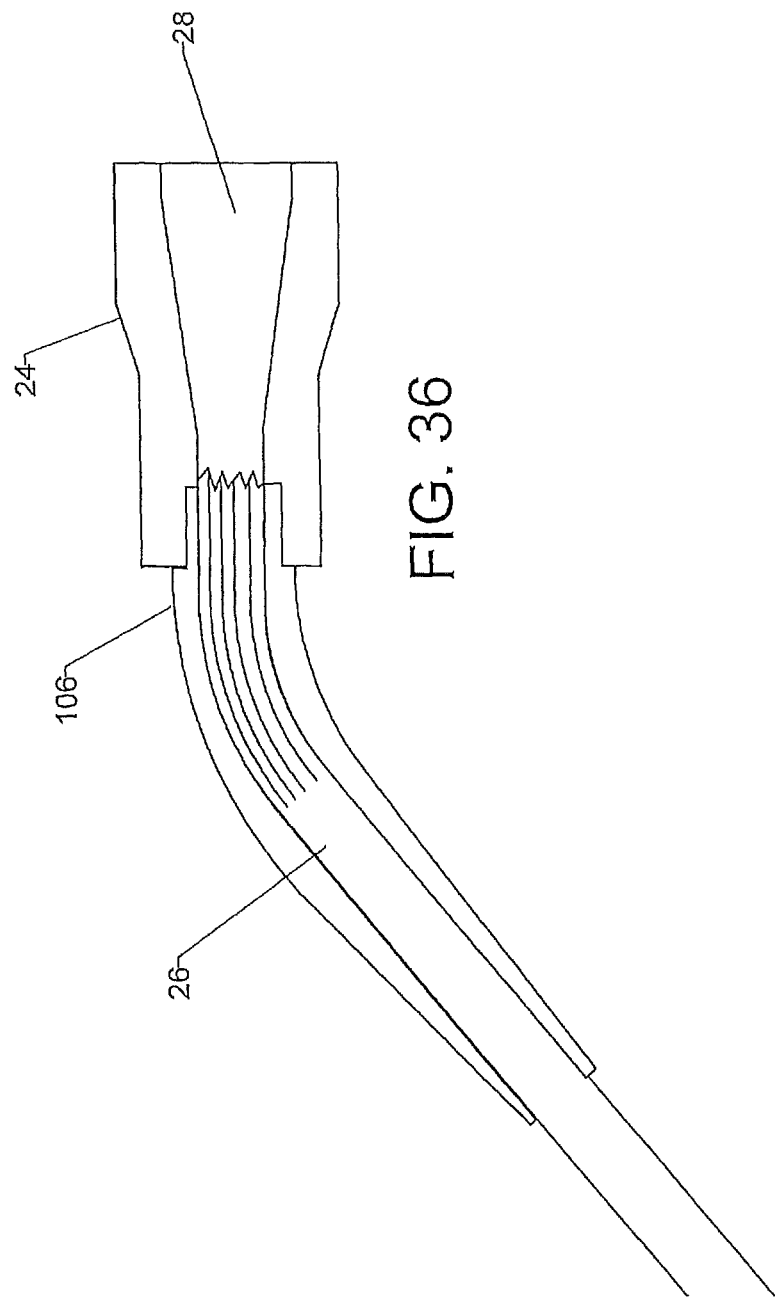
FIG. 36 is a sectional view, showing the inclusion of a flexible extension near the throat of an anchor.

Some embodiments may also include misalignment-accommodating features in the anchor itself. Such features relieve or reduce bending stresses and may be used solely to produce the needed strand alignment, to reduce the complexity of accompanying alignment devices, or to simply minimize stresses resulting from some other misalignment occurring when a particular design is loaded. FIGS. 35 and 36 provide examples of such features. In FIG. 35, large exit fillet 104 has been added to the anchor in the region where the strand exits the anchor. In the event of a misalignment, free elements 26 will not be forced against a sharp corner. Instead, they will be able to bend gently around the radius of the fillet. The reader will note that the bending region is distal to the transition region. This separation allows for bending. In effect, the anchor itself is controlling the bending region and the geometry is controlling the bending stresses.

FIG. 36 shows an anchor in which flexible extension 106 has been added. The flexible extension is made of a pliable material (similar to a strain relief used in electrical cords). When a misalignment occurs, flexible extension 106 prevents the formation of concentrated stress near the critical transition between the filaments lying within the anchor and the freely flexing filaments.

Figure 40:
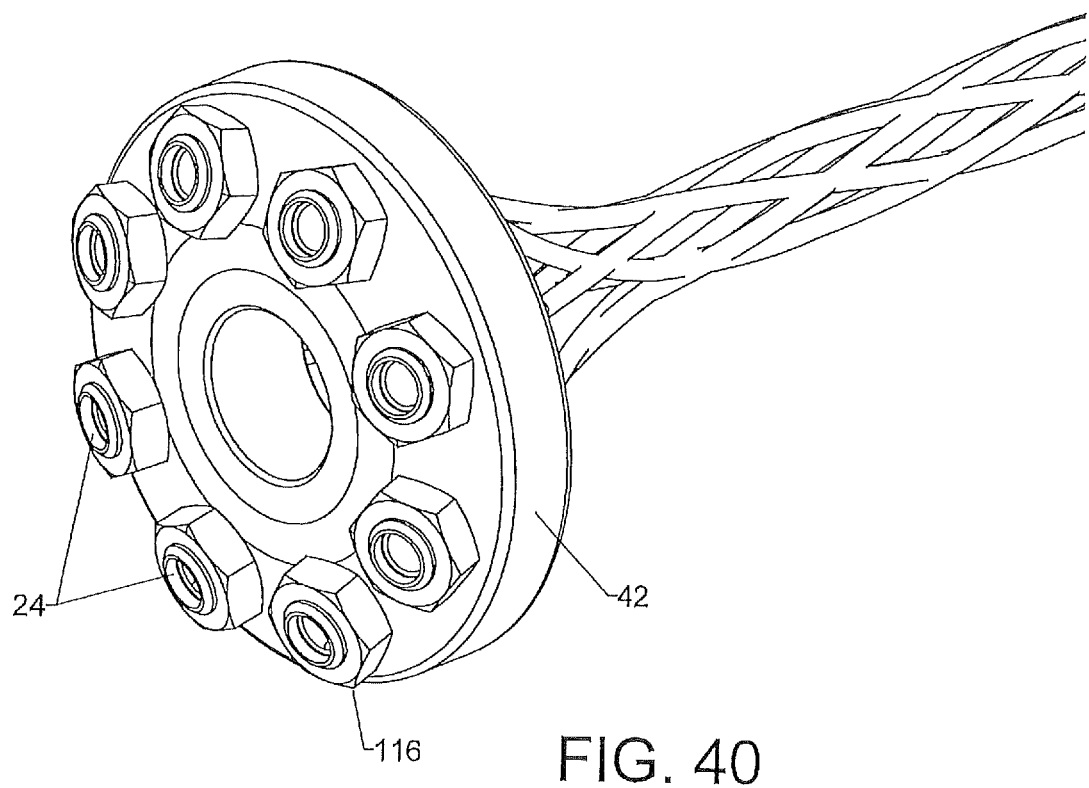
FIG. 40 is a perspective view, showing a different embodiment of a collector.
Figure 41:
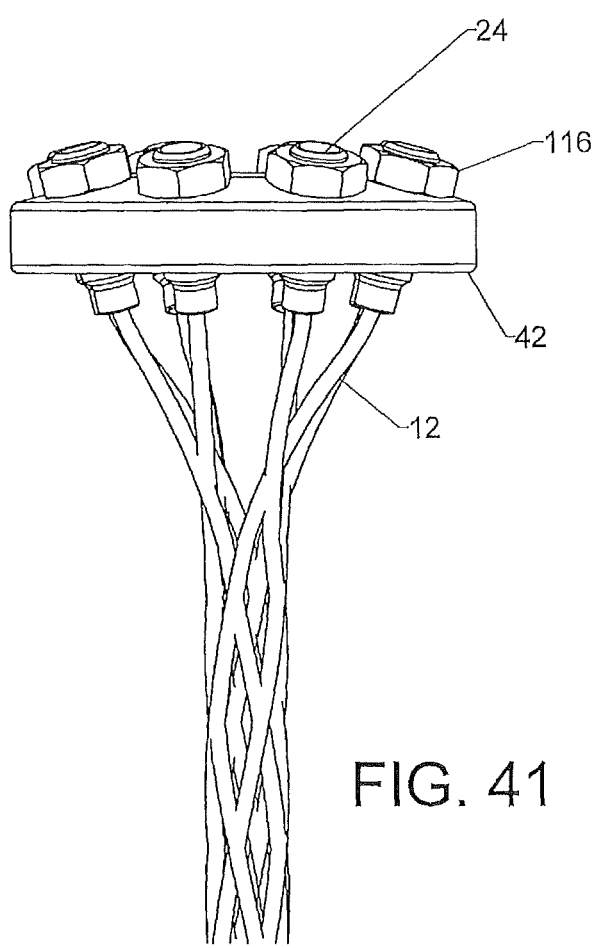
FIG. 41 is an elevation view, showing the assembly of FIG. 40.
Figure 42:
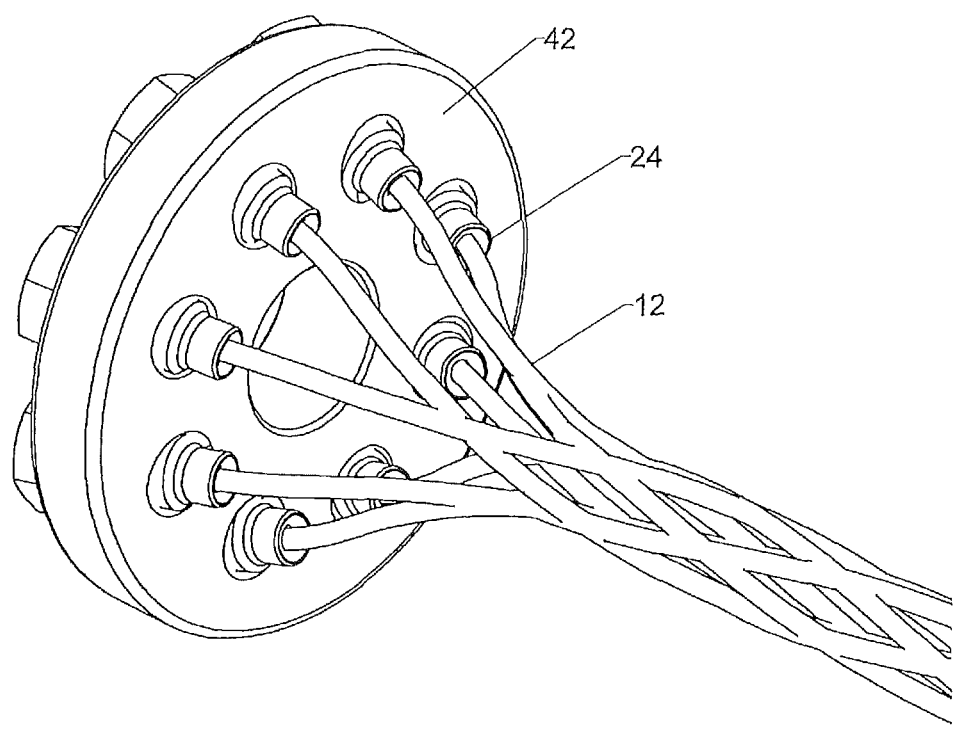
FIG. 42 is a perspective view, showing the assembly of FIGS. 39 and 40 from a different vantage point.

FIGS. 40-42 show still another embodiment of the present invention that optionally incorporates the misalignment-accommodating features such as shown in FIGS. 35 and 36. FIG. 40 shows a collector 42 that is essentially a flat plate. The plate includes 8 through holes that accommodate 8 anchors 24.

Each anchor incorporates a threaded stud. These protrude through collector 42. A nut 116 is attached to each threaded stud on each anchor. The nuts are tightened in order to adjust the tension on the strands attached to each anchor.

FIG. 41 shows the same assembly in an elevation view. The reader will observe that collector 42 is not completely flat. Instead, it incorporates a domed shape on one side. The through-hole sized to accept each anchor is drilled in a direction that is normal to the surface of the domed side. This fact causes the eight anchors 24 to be angled inward toward the central axis of the cable.

FIG. 42 shows the same assembly from the cable side of the collector 42. The reader will note that each of the anchors 24 includes a fillet in the area where the strand exits the anchor. The fillet is analogous to the one shown in the section view of FIG. 35. The presence of these fillets allows the angle of the individual strands to vary somewhat without placing undue stress on the strand.

The cable shown in this example is generally referred to as an "8-strand hollow braid." It is a braided assembly of 8 strands having no core element. When such a cable is loaded, the angle formed between each strand and the collector will vary. The presence of a fillet in each anchor (or other suitable bend-accommodating feature) is therefore preferable.

Looking still at FIG. 42, the reader may wish to know how the collector is connected to an external device. The central passage shown through the middle of collector 42 is useful for making external connections. A large threaded stud equipped with a flange can be attached to collector 42 by passing the threaded stud through the central passage in the collector and bringing the flange attached to the threaded stud up against the flat surface facing the viewer in FIG. 42.

Looking again at FIG. 41, those skilled in the art will realize that the dome shape provided for this particular example is not essential. One could instead use a completely flat plate. The angled holes would still be made for the anchors (using the same angles shown for the domed example). A shoulder for each nut 116 could then be created by counter-boring each of the holes to a small depth using a square-end mill. The nuts would then bear against these shoulders rather than the exterior surface of the collector itself.

Accordingly, the reader will understand that the proposed invention allows a relatively large cable made of synthetic filaments to be terminated using convention methods suitable for small cables. The inventive method and hardware involves: (1) dividing the cable into smaller components which are in the size range suitable for the prior art termination technology; (2) creating a termination on the end of each of the smaller components; (3) providing a collector which reassembles the individual terminations back into a single unit; and (4) maintaining alignment between the terminations and the smaller cable components while the terminations are "captured" within the collector.

The embodiments disclosed achieve these objectives. However, those skilled in the art will realize that many other forms of hardware could be used to carry out the invention. Although the preceding description contains significant detail, it should not be construed as limiting the scope of the invention but rather as providing illustrations of the preferred embodiments of the invention. Thus, the language used in the claims shall define the invention rather than the specific embodiments provided.

Having described our invention, we claim:

1. A termination for a multi-stranded cable having a non-parallel construction, wherein said stands of said multi-stranded cable are made of synthetic filaments, comprising:
    (a) a cable having a central axis and a plurality of strands;
    (b) wherein each strand of said plurality of strands within said cable follows a non-parallel path with respect to said central axis for a first portion of said cable lying outside said termination;
    (c) a plurality of anchors, with each of said anchors being attached to an end of one of said strands;
    (d) a collector;
    (e) wherein each of said anchors is attached to said collector;
    (f) an alignment fixture offset from said collector in a direction parallel to said central axis of said cable; and
    (g) said alignment fixture including a plurality of alignment channels, wherein each alignment channel is configured to alter a path of one of said strands from said non-parallel path in said first portion of said cable to a parallel path between said alignment fixture and said collector, wherein said parallel path is parallel to said central axis of said cable.

2. The termination for a multi-stranded cable as recited in claim 1, wherein each of said anchors is attached to said collector by a length-adjustable connection.

3. The termination for a multi-stranded cable as recited in claim 2, wherein said length-adjustable connection between each of said anchors and said collector comprises:
    (a) a plurality of threaded shafts, with each threaded shaft being attached to one of said anchors;
    (b) a plurality of passages through said collector, with each passage accommodating one of said threaded shafts; and
    (c) a plurality of nuts, with each nut being threaded onto one of said threaded shafts and being configured to bear against said collector.

4. The termination for a multi-stranded cable as recited in claim 3, further comprising:
   (a) a plurality of couplers; and
   (b) wherein each of said threaded shafts is connected to one of said anchors by one of said couplers.

5. The termination for a multi-stranded cable as recited in claim 3, wherein each of said anchors is attached so said end of said one strand by potting.

6. The termination for a multi-stranded cable as recited in claim 2, wherein each of said anchors is attached so said end of said one strand by potting.

7. The termination for a multi-stranded cable as recited in claim 2, wherein said collector includes an attachment feature.

8. The termination for a multi-stranded cable as recited in claim 1, wherein each of said anchors is attached so said end of said one strand by potting.

9. The termination for a multi-stranded cable as recited in claim 1, wherein said collector includes an attachment feature.

10. The termination for a multi-stranded cable as recited in claim 1, wherein said attachment feature is an eye.

\* \* \* \* \*